US011948308B2

(12) United States Patent
Choi

(10) Patent No.: US 11,948,308 B2
(45) Date of Patent: Apr. 2, 2024

(54) ELECTRONIC DEVICE AND OPERATION METHOD THEREOF

(71) Applicant: SAMSUNG ELECTRONICS CO., LTD., Suwon-si (KR)

(72) Inventor: Myungkyu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/752,301

(22) Filed: May 24, 2022

(65) Prior Publication Data

US 2023/0010408 A1  Jan. 12, 2023

Related U.S. Application Data

(63) Continuation of application No. PCT/KR2022/007036, filed on May 17, 2022.

(30) Foreign Application Priority Data

Jul. 9, 2021  (KR) .................. 10-2021-0090448

(51) Int. Cl.
  *G06T 7/155*  (2017.01)
  *G06T 5/10*  (2006.01)
  (Continued)

(52) U.S. Cl.
  CPC ............ *G06T 7/155* (2017.01); *G06T 5/10* (2013.01); *G06T 5/80* (2024.01); *G06T 7/194* (2017.01);
  (Continued)

(58) Field of Classification Search
  None
  See application file for complete search history.

(56) References Cited

U.S. PATENT DOCUMENTS 3,069,654 A  12/1962  Hough
8,625,932 B2  1/2014  Intwala
(Continued)

FOREIGN PATENT DOCUMENTS

JP   2019-185757   10/2019
KR   10-2018-0059723   6/2018
(Continued)

OTHER PUBLICATIONS

Search Report and Written Opinion dated Sep. 15, 2022 issued in International Patent Application No. PCT/KR2022/007036.
(Continued)

*Primary Examiner* — James A Thompson
(74) *Attorney, Agent, or Firm* — Nixon & Vanderhye, P.C.

(57) ABSTRACT

According to an embodiment of the disclosure, an electronic device may include: a display, a memory, and a processor operatively connected to the display and the memory. According to an embodiment, the memory may store instructions that, when executed, cause the processor to: obtain a first image of a first shape, obtain linear information indicating a morphological characteristic of an object in the first image of the first shape, determine a conversion method for converting the first image of the first shape into an image of a second shape based on the obtained linear information, convert the first image of the first shape into a second image of the second shape based on the determined conversion method, and control the display to display the converted second image of the second shape on the display.

20 Claims, 16 Drawing Sheets

(51) Int. Cl.
*G06T 5/80* (2024.01)
*G06T 7/194* (2017.01)
*G06V 10/25* (2022.01)
*G06V 10/46* (2022.01)
*G06V 10/48* (2022.01)
*G06V 10/77* (2022.01)

(52) U.S. Cl.
CPC ............. *G06V 10/25* (2022.01); *G06V 10/46* (2022.01); *G06V 10/48* (2022.01); *G06V 10/7715* (2022.01); *G06T 2207/20036* (2013.01)

(56) References Cited

U.S. PATENT DOCUMENTS

| | | |
|---|---|---|
| 8,731,336 B2 | 5/2014 | Reese et al. |
| 9,176,643 B2 | 11/2015 | Elia et al. |
| 9,760,974 B2 | 9/2017 | Irie et al. |
| 10,032,260 B2 | 7/2018 | Choi et al. |
| 10,304,157 B2 | 5/2019 | Irie et al. |
| 10,699,389 B2 | 6/2020 | Van Der Auwera et al. |
| 11,699,213 B2 | 7/2023 | Ban et al. |
| 2005/0010955 A1 | 1/2005 | Elia et al. |
| 2013/0121619 A1 | 5/2013 | Intwala |
| 2013/0156344 A1 | 6/2013 | Reese et al. |
| 2016/0048942 A1 | 2/2016 | Irie et al. |
| 2017/0161880 A1* | 6/2017 | Choi .................. G06T 15/10 |
| 2017/0345136 A1 | 11/2017 | Van Der Auwera et al. |
| 2017/0357869 A1* | 12/2017 | Shustorovich ..... G06V 30/2253 |
| 2018/0032837 A1 | 2/2018 | Hiroike et al. |
| 2018/0149487 A1* | 5/2018 | Lee .................... G01C 21/3841 |
| 2019/0114776 A1* | 4/2019 | Balch .................. G06T 7/0012 |
| 2020/0382757 A1 | 12/2020 | Oh et al. |
| 2021/0092257 A1 | 3/2021 | Jia et al. |
| 2021/0390673 A1 | 12/2021 | Ban et al. |

FOREIGN PATENT DOCUMENTS

| | | |
|---|---|---|
| KR | 10-2183397 | 11/2020 |
| KR | 10-2021-0030466 | 3/2021 |

OTHER PUBLICATIONS

Fong, "Squircular Calculations", Joint Mathematics Meetings 2018, SIGMAA-ARTS, pp. 1-38.

Fong, "Ahalytical Methods for Squaring the Disc", Seoul ICM 2014, pp. 1-33.

Fong, "Elliptification of Rectangular Imagery", Joint Mathematics Meetings 2019, SIGMAA-ARTS, 69 pages.

Fong et al., "A Poor Man's Hyperbolic Square Mapping", Bridges 2018 Conference Proceedings, pp. 59-66.

Kacmajor, "Hough Lines Transform Explained", tomaszkacmajor. pl, Jun. 5, 2017, 11 pages.

ORB (Oriented Fast and Rotated Brief), The Wayback Machine, 3 pages.

* cited by examiner

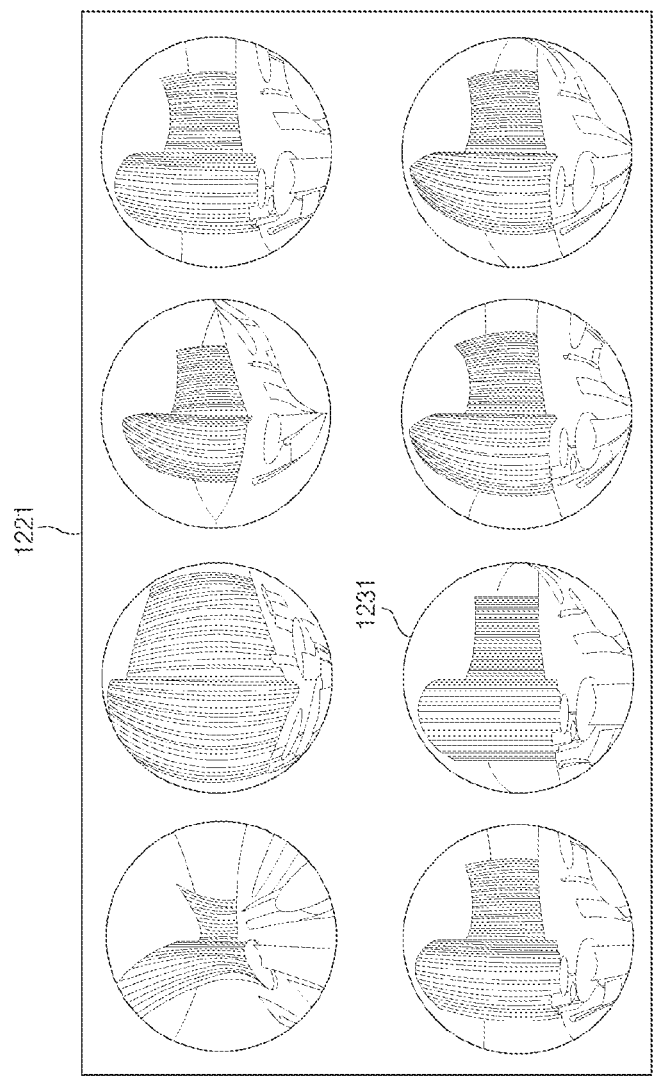
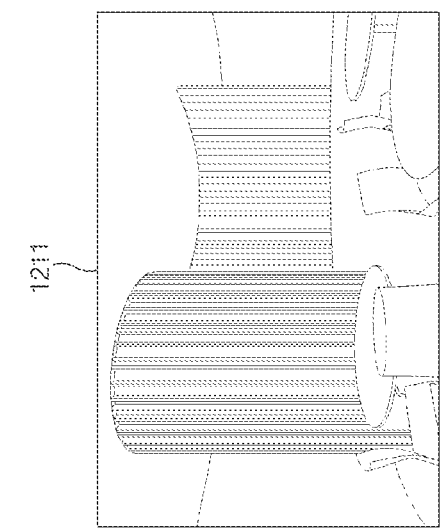
FIG. 12

ELECTRONIC DEVICE AND OPERATION METHOD THEREOF

CROSS-REFERENCE TO RELATED APPLICATIONS

This application is a continuation of International Application No. PCT/KR2022/007036 designating the United States, filed on May 17, 2022, in the Korean Intellectual Property Receiving Office and claiming priority to Korean Patent Application No. 10-2021-0090448, filed on Jul. 9, 2021, in the Korean Intellectual Property Office, the disclosures of which are incorporated by reference herein in their entireties.

BACKGROUND

Field

The disclosure relates to an electronic device and an operating method thereof.

Description of Related Art

While various wearable devices are developed, shapes of displays mounted on the wearable devices are also changed in various manners. An electronic device may provide various pieces of visual information to a user by displaying multimedia including images on various types of displays.

When converting a rectangular image into a circular image in a fixed image conversion method without considering characteristics of an object included in an image, an object included in an image may be distorted.

SUMMARY

Embodiments of the disclosure provide an electronic device that is capable of displaying the converted image with improved quality on a display by determining an image conversion method that reduces distortion when converting a rectangular image to a circular image based on information indicating characteristics of an image.

According to an embodiment of the disclosure, an electronic device may include: a display, a memory, and a processor operatively connected to the display and the memory. According to an embodiment, the memory may store instructions that, when executed, cause the processor to: obtain a first image of a first shape, obtain linear information indicating a morphological characteristic of an object in the first image of the first shape, determine a conversion method for converting the first image of the first shape into an image of a second shape based on the obtained linear information, convert the first image of the first shape into a second image of the second shape based on the determined conversion method, and display the converted second image of the second shape on the display.

Furthermore, according to an embodiment of the disclosure, an operation method of an electronic device may include: obtaining a first image of a first shape, obtaining linear information indicating a morphological characteristic of an object in the first image of the first shape, determining a conversion method for converting the first image of the first shape into an image of a second shape based on the obtained linear information, converting the first image of the first shape into a second image of the second shape based on the determined conversion method, and displaying the converted second image of the second shape on a display.

According to various embodiments of the disclosure, it is possible to provide an electronic device that is capable of displaying the converted image with improved quality on a circular display by determining an image conversion method that reduces distortion when converting a rectangular image to a circular image based on information indicating characteristics of an image.

Besides, a variety of effects directly or indirectly understood through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 12 illustrates an example of an electronic device converting a rectangular image into a circular image using an image conversion method determined based on linear information, according to various embodiments;

With regard to description of drawings, the same or similar components will be marked by the same or similar reference signs.

DETAILED DESCRIPTION

Figure 1:
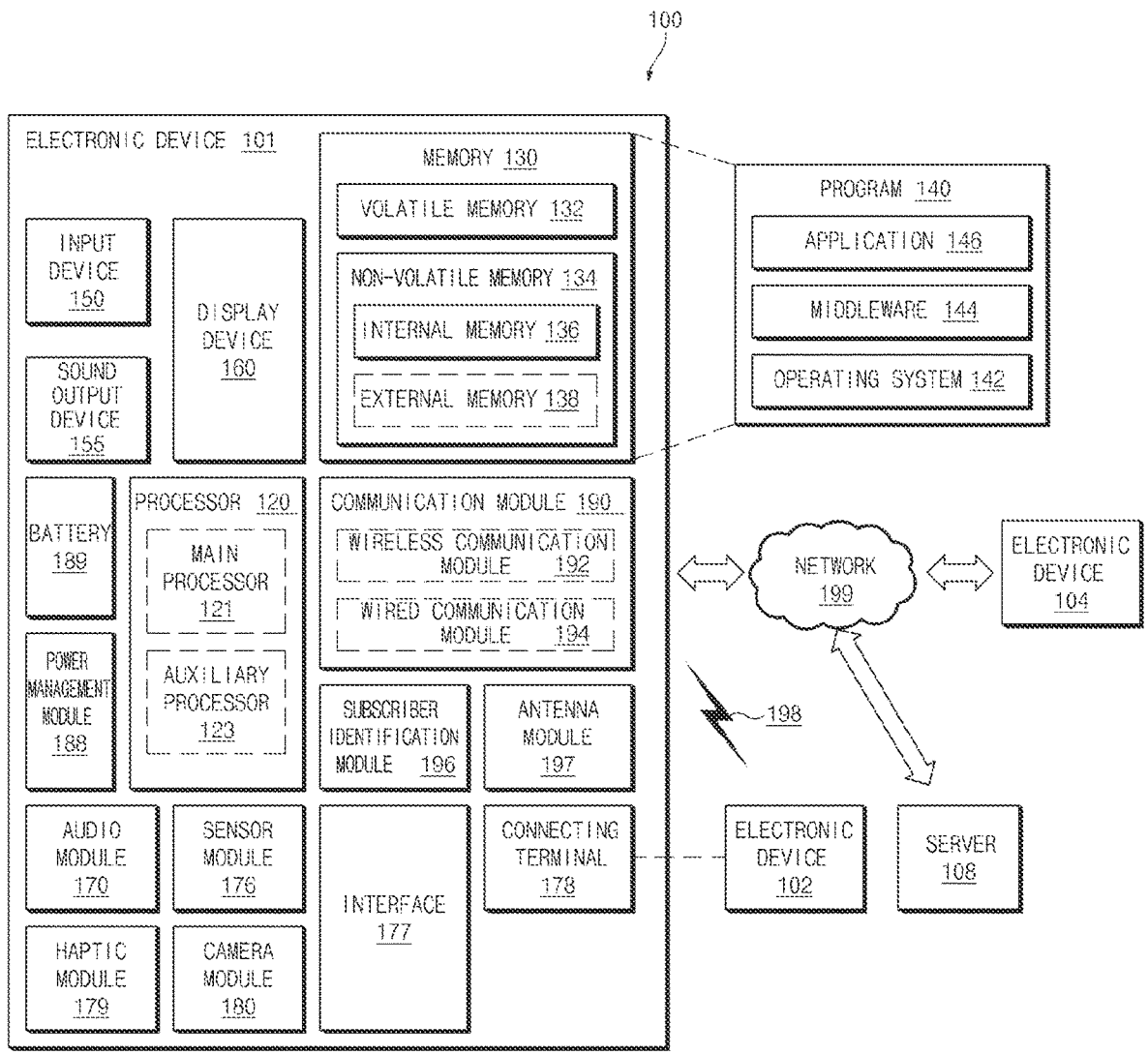
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
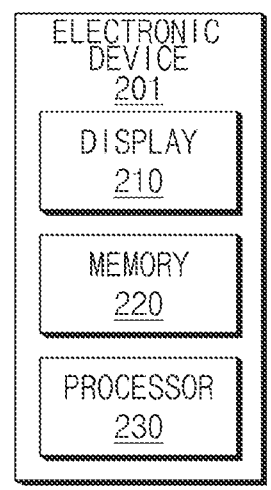
FIG. 2 is a block diagram illustrating an example configuration of an electronic device, according to various embodiments.

FIG. 2 is a block diagram illustrating an example configuration of an electronic device, according to various embodiments.

According to an embodiment, an electronic device 201 (e.g., the electronic device 101 of FIG. 1) may include a display 210 (e.g., the display module 160 of FIG. 1), a memory 220 (e.g., the memory 130 in FIG. 1), and a processor (e.g., including processing circuitry) 230 (e.g., the processor 120 of FIG. 1).

According to an embodiment, the display 210 may visually provide information to the outside (e.g., the user) of the electronic device 201. The display 210 may include, for example, and without limitation, a display, a hologram device, or a control circuit for controlling a projector and a corresponding device. According to an embodiment, the display 210 may have various shapes. For example, the display 210 may include a circular, edge-rounded, or rectangular display area. Through various shapes of display areas, the display 210 may expose information to the outside or may provide the information to a user According to an embodiment, when the electronic device 201 is a wearable device (e.g., a smart watch) capable of being worn on the user's body, the display area of the display 210 may have a circular shape or an edge-rounded shape.

According to an embodiment, the memory 220 may store various pieces of data (or information). According to an embodiment, the memory 220 may store at least one program, at least one application, data, or instructions, which are executed by the processor 230. According to an embodiment, the memory 220 may include at least part of the memory 130 illustrated in FIG. 1. According to an embodiment, the memory 220 may store information or instructions that allow at least part of operations of the electronic device 201, which will be described later, to be performed. According to an embodiment, the memory 220 may store instructions associated with a plurality of applications executed by the processor 230. According to an embodiment, the memory 220 may store information necessary for an operation of the electronic device 201 and/or information associated with the user.

According to an embodiment, the memory 220 may store various pieces of information to be visually provided to the user through the display 210. For example, the memory 220 may store at least one image to be displayed on the display 210. For example, the memory 220 may store at least one video to be displayed on the display 210. Hereinafter, an image may be interpreted as including a video or an image included in the video.

According to an embodiment, the memory 220 may include a database including information to be used during image conversion. According to an embodiment, the database (or the memory 220) may include at least one image (or a video) and/or at least one image conversion method (or an equation for image conversion) to be used during image conversion.

According to an embodiment, the processor 230 may be operatively connected to other configurations of the electronic device 201 and may include various processing circuitry configured to control various operations of the electronic device 201. For example, the processor 230 may include an application processor of the electronic device 201. The processor 230 may perform various operations of the electronic device 201 by executing one or more instructions stored in the memory 220. Hereinafter, operations described as being performed by the electronic device 201 may be referred to as being performed by the processor 230.

According to an embodiment, the processor 230 may transform a shape (or an exterior appearance) of an image based on the shape of the display area of the display 210. For example, the processor 230 may warp a shape (or an exterior appearance) of an image based on the shape of the display area of the display 210. In an embodiment, when the display area of the display 210 has a circular shape or an edge-rounded shape, the processor 230 may transform (or warp) a rectangular image into a circular shape or an edge-rounded shape. In an embodiment, when the display area of the display 210 is a circular shape or an edge-rounded shape, the processor 230 may transform (or warp) the rectangular image into a circular or edge-rounded image in a manner having less distortion depending on an individual characteristic of the rectangular image.

According to an embodiment, the processor 230 may transform (or warp) the shape of a raw image to reduce the loss of information included in a raw image. In an embodiment, the processor 230 may determine a method for transforming (or warping) the shape of an image capable of reducing loss of information included in the raw image. In an embodiment, without using a uniform image conversion method, the processor 230 may determine (or select) an image conversion method that reduces the distortion of information, which is included in the image during conversion, or the loss of information depending on the individual characteristics of the raw image. The processor 230 may transform (or warp) the shape of the raw image depending on the determined image conversion method and may display the transformed (or warped) image on the display 210. For example, the processor 230 may convert (or warp) a rectangular image into a circular or edge-rounded image by transforming (or warping) a rectangular image in a manner having less distortion depending on the individual characteristic of the rectangular image (e.g., a raw image). The processor 230 may display the transformed (or warped) image on the display 210 having a circular or an edge-rounded display area.

According to an embodiment, the processor 230 may analyze an image (e.g., an original image) and then may obtain (or generate) linear information indicating a characteristic of the corresponding rectangular image as a result of the analysis. According to an embodiment, the linear information indicating the characteristic of the image may indicate a morphological characteristic of at least one object included in the image or the background of the image. For example, the linear information indicating the characteristic of the image may include linear information obtained from an image through Hough transform (or Hough line transform). For example, the linear information indicating the characteristic of the image may include at least one line information or at least one straight line information, which is detected from the image through the Hough transform. For example, the linear information indicating the characteristic of the image may include information about a Hough line detected from the image through the Hough transform. For example, the linear information may include a Hough line or may include information about a Hough line.

In various embodiments, when converting a rectangular image to a circular or edge-rounded image, the processor 230 may perform a preprocessing of converting (or resizing) a rectangular image into a square image to reduce the sense of difference that a user may feel. The processor 230 may analyze the preprocessed square image and then may obtain linear information (e.g., linear information obtained through Hough transform) indicating a characteristic of the corresponding square image. For example, a square image (or an image having a square shape) may correspond to an image in which four sides (or edges) forming the shape of an image have the same length of a first value. For example, a square image may correspond to an image in which four sides forming the shape of the image have the same length. For example, a rectangular image (or an image having a rectangle shape) may correspond to an image in which two among four sides forming the shape of the image have a length of the first value, and the other two sides have a length of a second value different from the first value. For example, a rectangular image may correspond to an image in which two sides, which are met at one vertex, from among the four sides forming the shape of the image have different lengths from each other (e.g., having a ratio value (e.g., 1:2)).

According to an embodiment, when converting a rectangular image into a circular or an edge-rounded image using the obtained linear information, the processor 230 may determine an image conversion method for reducing a change in an object of an image. For example, the rectangular image may be a raw image having a rectangle or square shape, or may be an image obtained by performing a preprocessing of converting a rectangular raw image into a square image. According to an embodiment, when converting (or warping) the rectangular image, the processor 230 may determine an image conversion method for reducing the distortion of the object of the image, using the obtained linear information. According to an embodiment, the processor 230 may convert (or warp) a rectangular image into a circular or edge-rounded image using the image conversion method determined depending on the characteristic of an individual image, not applying a consistent image conversion method to different images. For example, the processor 230 may determine (or select) at least one image conversion method in a database including at least one image conversion method (or an equation for image conversion), which is to be used when converting the image stored in the memory 220, using the obtained linear information. The processor 230 may convert (or warp) a rectangular image into a circular or edge-rounded image using the at least one image conversion method thus determined (or selected).

In various embodiments, the processor 230 may determine the image conversion method for reducing the distortion of the object of the image using artificial intelligence. According to an embodiment, the processor 230 may learn an image using a machine learning model. For example, the processor 230 may learn characteristics of an image using the machine learning model and then may determine an image conversion method for reducing the distortion of the object of the image during image conversion (or warping) depending on the learned result. For example, when converting (or warping) an image of a quadrangle (e.g., rectangle or square) into a circular image using the machine learning model, the processor 230 may determine an image conversion method in which a change in an object or feature (e.g., feature or linear information) of an image is small or minimized. In an embodiment, the processor 230 may convert (or warp) a rectangular image into a circular image in the image conversion method determined using the machine learning model.

According to an embodiment, the processor 230 may display the converted (or warped) image on the display 210. The processor 230 may display the image converted (or warped) using the image conversion method for reducing the distortion of the object of the image depending on the characteristic of an individual image, on the display 210. For example, a raw image may correspond to a rectangular (rectangular or square) shape; and, the display 210 may include a circular or edge-rounded display area. The processor 230 may be configured to display an image on the display 210 with a circular or edge-rounded display area, in a state where image distortion or omission of information included in the image is reduced. The processor 230 may convert (or warp) the raw image in an image conversion method determined depending on characteristics of the raw image and then may display the converted (or warped) image on the display 210.

In various embodiments, the processor 230 may provide an augmented reality service. According to an embodiment, the processor 230 may display an image, which is converted (or warped) in the above-described manner, on the augmented reality service. For example, the processor 230 may provide the augmented reality service by displaying a circular (or edge-rounded) image converted (or warped) in an image conversion method for reducing the distortion of an object of the image on at least part of a transparent display.

In various embodiments, the electronic device may store the image conversion method (or an equation for image conversion), which is used to transform a rectangular image into a circular image, in the memory 220. According to an embodiment, the electronic device may receive, from a user, a user input for enlarging, reducing, or moving the converted circular image. The electronic device may restore (or inversely transform) a circular image to an original rectangular image using the stored image conversion method, based on the received user input. The electronic device may enlarge, reduce, or move the restored original rectangular image based on the received user input.

Various embodiments for displaying a rectangular image having reduced distortion of the object of the image on a display having a circular or edge-rounded display area are described in greater detail below with reference to the drawings.

Figure 3:
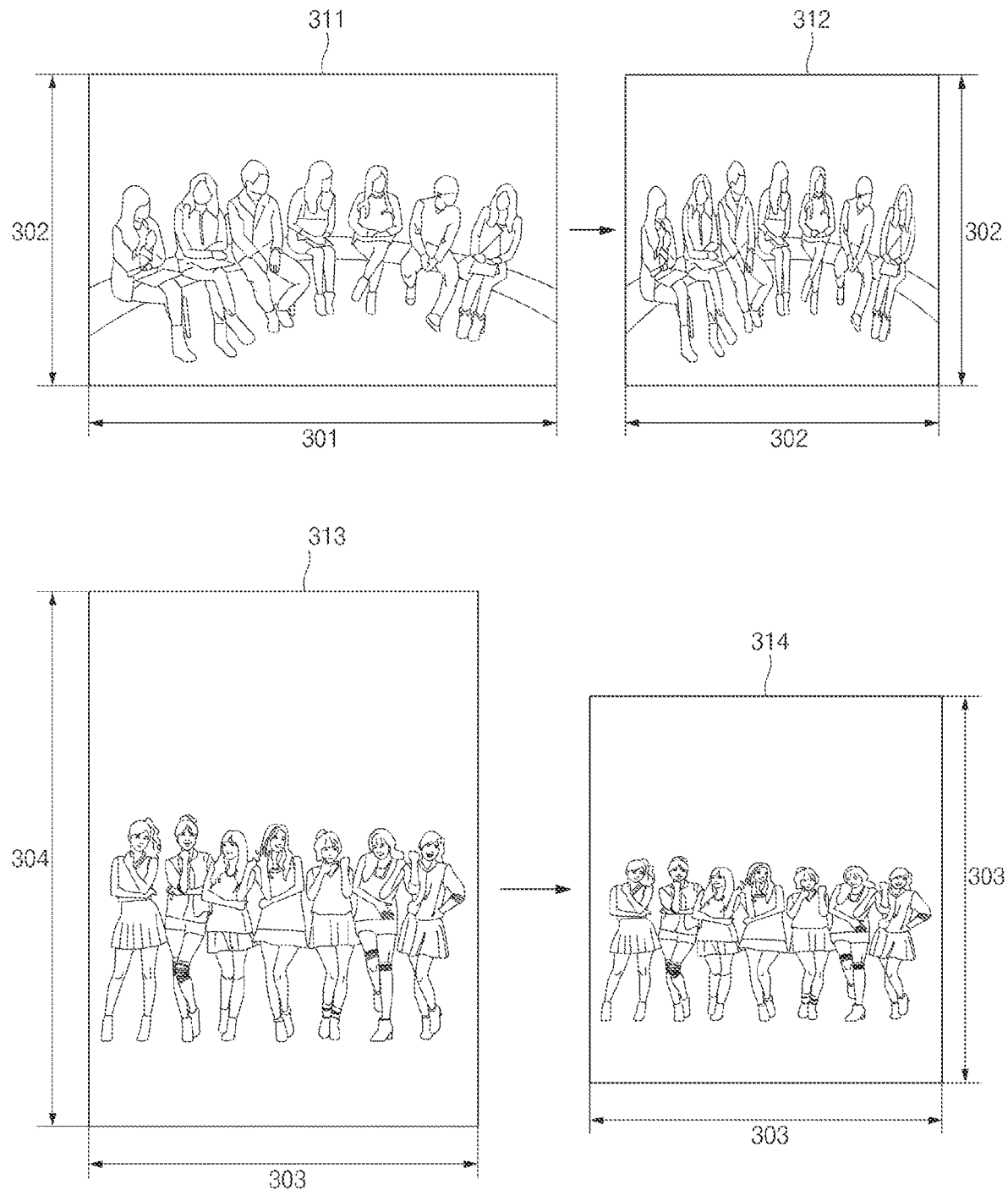
FIG. 3 is a diagram illustrating an embodiment in which an electronic device converts a rectangular image into a square image, according to various embodiments.

FIG. 3 is a diagram illustrating an embodiment in which an electronic device converts a rectangular image into a square image, according to various embodiments.

Referring to FIG. 3, to reduce image distortion or the sense of difference that a user may feel, an electronic device (e.g., the electronic device 101 of FIG. 1 or the electronic device 201 of FIG. 2) may perform a preprocessing of converting (or resizing) a rectangular image into a square image.

Referring to FIG. 3, the electronic device according to an embodiment may generate a square image by resizing a rectangular raw image based on a length of the relatively-short side.

FIG. 3 illustrates a first image 311 corresponding to a raw image and a second image 312 corresponding to a converted image. According to an embodiment, the first image 311 may correspond to a rectangular image having horizontal and vertical lengths that are different from each other. According to an embodiment, the electronic device may reduce the horizontal length of the first image 311. For example, a length of a first side of the first image 311 may correspond to a first value 301, and a length of a second side of the first image 311 may correspond to a second value 302. According to an embodiment, an electronic device may convert the first image 311 into the second image 312 by resizing the first image 311. For example, the electronic device may generate the second image 312 from the first image 311 by reducing the length of the first side of the first image 311 from the first value 301 to the second value 302.

FIG. 3 illustrates a third image 313 corresponding to a raw image and a fourth image 314 corresponding to a converted image. According to an embodiment, the third image 313 may correspond to a rectangular image having horizontal and vertical lengths that are different from each other. According to an embodiment, the electronic device may reduce the vertical length of the third image 313. For example, a length of a first side of the third image 313 may correspond to the third value 303, and a length of a second side of the third image 313 may correspond to a fourth value 304. According to an embodiment, an electronic device may convert the third image 313 into the fourth image 314 by resizing the third image 313. For example, the electronic device may generate the fourth image 314 from the third first image 313 by reducing the length of the second side of the third image 313 from the fourth value 304 to the third value 303.

Figure 4:
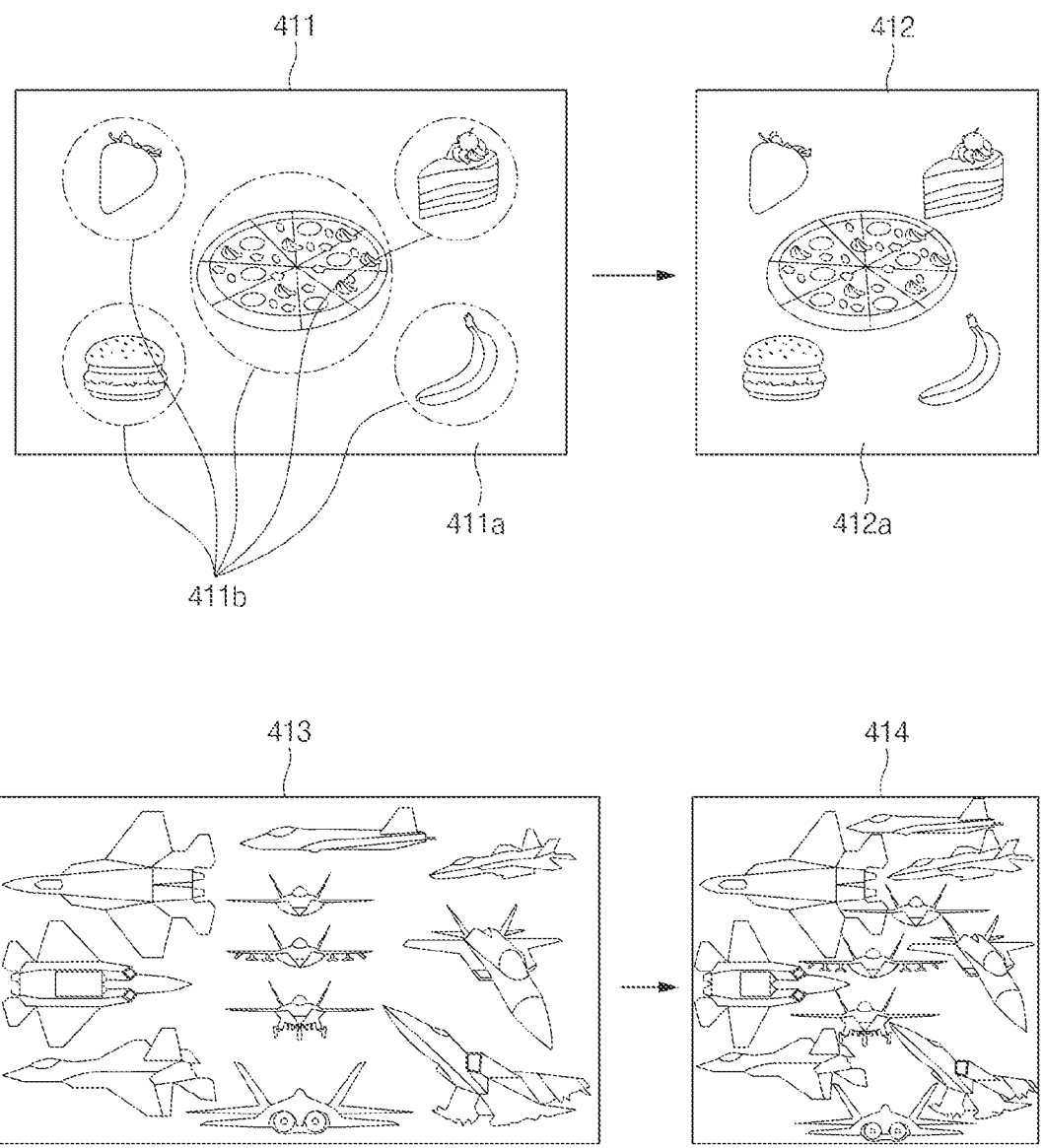
FIG. 4 is a diagram illustrating an embodiment in which an electronic device converts a rectangular image into a square image, according to various embodiments.

FIG. 4 is a diagram illustrating an embodiment in which an electronic device converts a rectangular image into a square image, according to various embodiments.

Referring to FIG. 4, to reduce image distortion or the sense of difference that a user may feel, an electronic device (e.g., the electronic device 101 of FIG. 1 or the electronic device 201 of FIG. 2) may perform a preprocessing of converting (or resizing) a rectangular image into a square image.

Referring to FIG. 4, the electronic device according to an embodiment may distinguish between a background and an object (or a main object) that are included in a rectangular raw image. When the background is simple, the electronic device according to an embodiment may reduce the background and then may change the rectangular raw image to a square image. The electronic device may generate the square image by adjusting a location of the object to position the object on a square background. For example, when the background is composed of a single color, the electronic device may recognize that the background is simple.

FIG. 4 illustrates a first image 411 corresponding to a raw image and a second image 412 corresponding to a converted image. The electronic device may generate the second image 412 obtained by reducing the first image 411 to a square image. According to an embodiment, the first image 411 may correspond to a rectangular image having horizontal and vertical lengths that are different from each other. According to an embodiment, the electronic device may recognize a background 411a and at least one object 411b, which are included in the first image 411. The electronic device may recognize the number of at least one object 411b and the location of at least one object. According to an embodiment, the electronic device may recognize that the recognized background 411a is a simple background composed of a single color. According to an embodiment, the electronic device may reduce the rectangular background 411a based on the length of the relatively-short side and then may convert the rectangular background 411a into a square background 412a. According to an embodiment, the electronic device may position the at least one object on the converted square background 412a by moving the location of the at least one object. For example, the electronic device may generate the second image 412 having the square shape by moving the location of at least one object with respect to the center of the square background 412a.

FIG. 4 illustrates a third image 413 corresponding to a raw image and a fourth image 414 corresponding to a converted image. The electronic device may generate the fourth image 414 obtained by reducing the third image 413 to a square image. According to an embodiment, the third image 413 may correspond to a rectangular image having horizontal and vertical lengths that are different from each other. According to an embodiment, the electronic device may recognize a background and at least one object (e.g., the number and location of at least one object) included in the third image 413 in the same and/or similar manner as described above. When the recognized background is a simple background composed of a single color, the electronic device may convert the background into a square background by reducing the background. The electronic device may position the at least one object on the converted square background by adjusting the location of the at least one object. For example, the electronic device may generate the fourth image 414 having the square shape by moving the location of at least one object with respect to the center of the square-shaped background.

Figure 5:
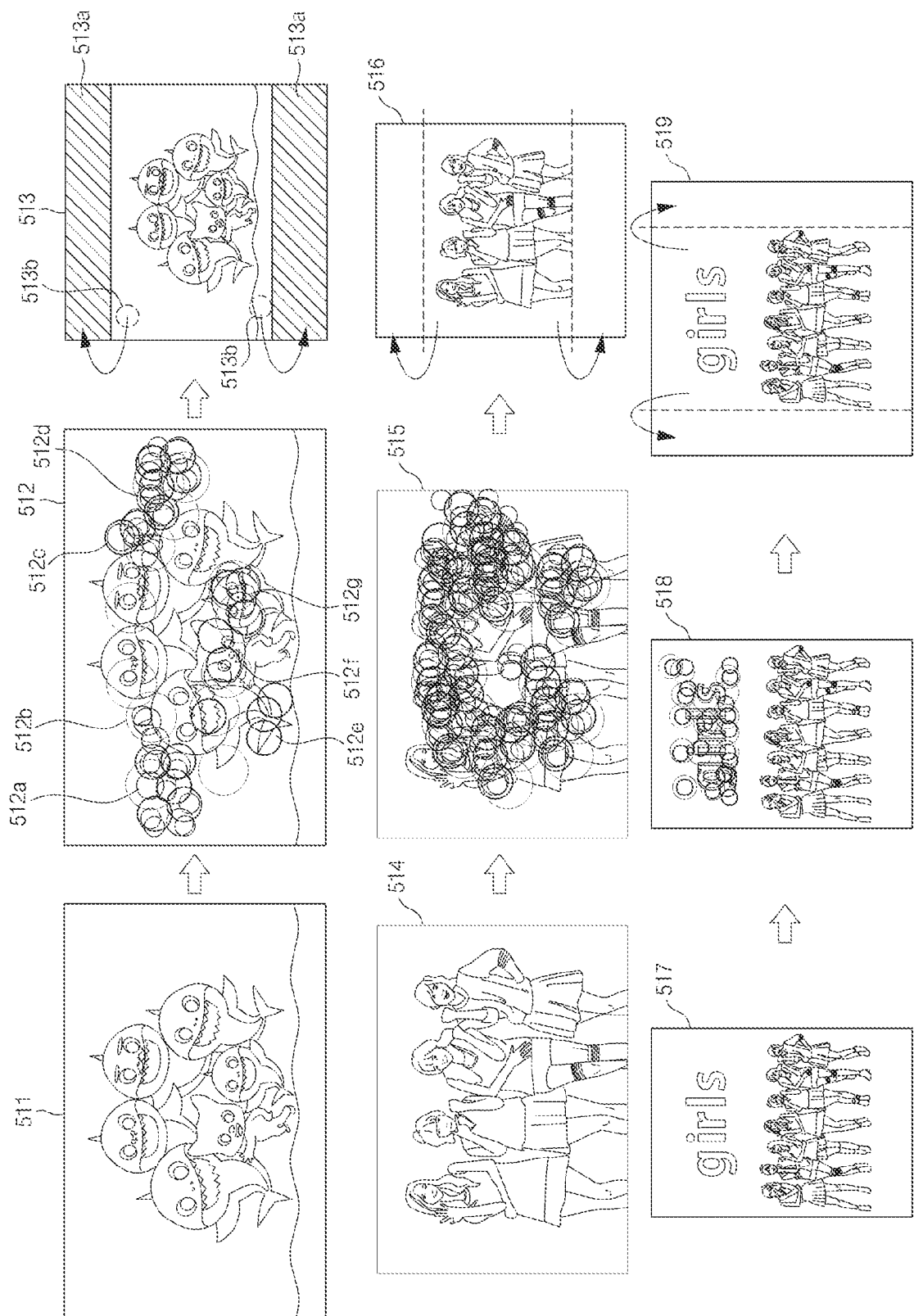
FIG. 5 is a diagram illustrating an embodiment in which an electronic device converts a rectangular image into a square image, according to various embodiments.

FIG. 5 is a diagram illustrating an embodiment in which an electronic device converts a rectangular image into a square image, according to various embodiments.

Referring to FIG. 5, to reduce image distortion or the sense of difference that a user may feel, an electronic device (e.g., the electronic device 101 of FIG. 1 or the electronic device 201 of FIG. 2) may perform a preprocessing of converting (or resizing) a rectangular image into a square image.

Referring to FIG. 5, the electronic device according to an embodiment may distinguish a background and an object, which are included in a rectangular raw image, and then may generate a square image by enlarging at least part of the background.

Referring to FIG. 5, the electronic device may obtain a first image 511 corresponding to a raw image. For example, the first image 511 may correspond to a rectangular image having horizontal and vertical lengths different from each other. According to an embodiment, the electronic device may recognize the background and at least one object that are included in the first image 511. For example, the electronic device may recognize the background, which is included in the first image 511, and the number and/or size of at least one object included in the first image 511.

In various embodiments, the electronic device may distinguish (or individually recognize) the background of the first image 511 and at least one object of the first image 511. The second image 512 illustrated in FIG. 5 illustrates an operation in which the electronic device distinguishes between the background of the first image 511 and at least one object of the first image 511. In various examples, to easily distinguish between a background and at least one object, the electronic device may generate a second image 512 by converting the first image 511 into an image having a grayscale (or black and white color). FIG. 5 illustrates that at least one feature (512a, 512b, 512c, 512d, 512e, 512f, 512g) is obtained from the second image 512 converted to an image having the grayscale. However, in various examples, the electronic device may obtain a feature from the first image 511 that is a raw image before the conversion to the grayscale.

According to an embodiment, the electronic device may distinguish between the background and at least one object, which are included in the first image 511, based on the features (512a, 512b, 512c, 512d, 512e, 512f, 512g) of the second image 512. In an embodiment, the electronic device may individually recognize the background of the image and at least one object based on the features (512a, 512b, 512c, 512d, 512e, 512f, 512g) of the image (e.g., the first image 511 or the second image 512). According to an embodiment, the electronic device may use an Oriented FAST and Rotated BRIEF (ORB) method (or algorithm) for obtaining features of an image using edge information of at least one object included in the second image 512.

According to an embodiment, the electronic device may calculate the complexity of the second image 512 based on at least one feature (512a, 512b, 512c, 512d, 512e, 512f, 512g) extracted (or obtained) by the ORB method. According to an embodiment, the electronic device may distinguish between at least one object and the background based on the calculated complexity. For example, the electronic device may distinguish between at least one object and the background by performing an image segment operation based on the calculated complexity. According to an embodiment, the electronic device may recognize the background and at least one object, and then may enlarge at least part of the recognized background.

A third image 513 illustrated in FIG. 5 illustrates that the electronic device converts the first image 511, which is a rectangular raw image, into a square image. According to an embodiment, the electronic device may enlarge at least part of the recognized background and then may generate the third image 513 having a square shape. In an embodiment, the generated third image 513 may be an image in which at least part of the background is enlarged, not enlarging the object. According to an embodiment, the electronic device may determine a pixel value (or color) that is the same as or similar to that in a second area 513b adjacent to a first area 513a in which the background is to be enlarged. The electronic device may fill the first area 513a, in which the background is to be enlarged, with the determined pixel value. For example, the electronic device may fill the first area 513a, in which the background is to be enlarged, with the determined pixel value in an in-painting scheme. In the same and/or similar manner as described above, other images 514, 515, 516, 517, 518, and 519 illustrated in FIG. 5 illustrate that the electronic device converts a rectangular image into a square image by enlarging a background.

Figure 6:
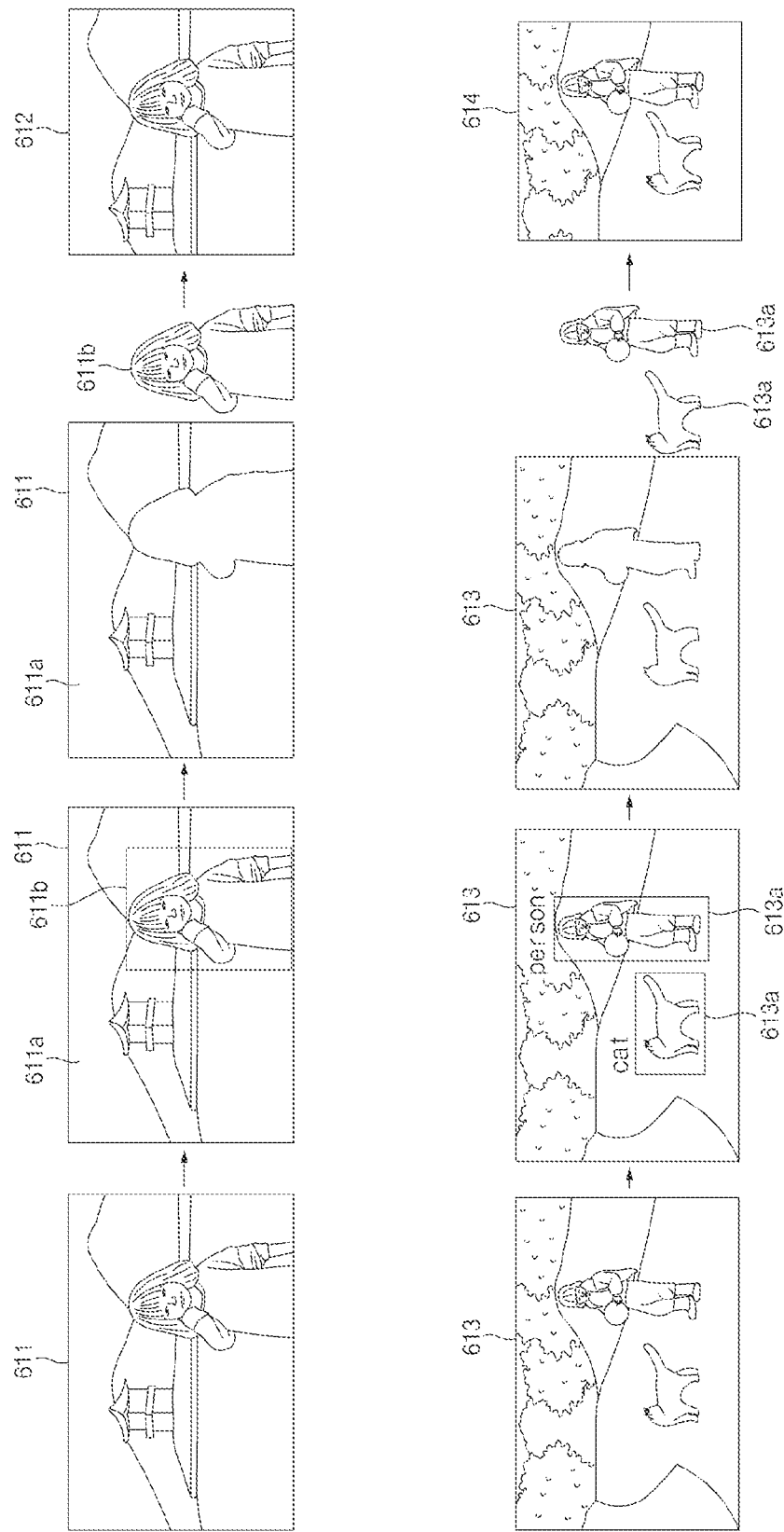
FIG. 6 is a diagram illustrating an embodiment in which an electronic device converts a rectangular image into a square image, according to various embodiments.

FIG. 6 is a diagram illustrating an embodiment in which an electronic device converts a rectangular image into a square image, according to various embodiments.

Referring to FIG. 6, to reduce image distortion or the sense of difference that a user may feel, an electronic device (e.g., the electronic device 101 of FIG. 1 or the electronic device 201 of FIG. 2) may perform a preprocessing of converting (or resizing) a rectangular image into a square image.

Referring to FIG. 6, the electronic device according to an embodiment may separate a background and an object from a rectangular raw image, may transform the background into a square background, may compose the object and the square background, and may generate a square image.

Referring to FIG. 6, the electronic device may obtain a first image 611 corresponding to a raw image. For example, the first image 611 may correspond to a rectangular image having horizontal and vertical lengths different from each other.

According to an embodiment, the electronic device may distinguish between a background 611a and at least one object 611b in the first image 611. In the method (e.g., calculating complexity using features extracted in the ORB method) described with reference to FIG. 5, the electronic device may distinguish between the background 611a and the at least one object 611b in the first image 611. in various methods in addition to the method described with reference to FIG. 5, the electronic device may distinguish between the background 611a and the at least one object 611b.

According to an embodiment, the electronic device may separate the recognized at least one object 611b from the first image 611. According to an embodiment, the electronic device may generate a square image by reducing the first image 611 including the background 611a other than the at least one object 611b. In an embodiment, the electronic device may reduce the first image 611 including the background 611a excluding at least one object 611b and then may convert the first image 611 into a square image. For example, similarly to that described with reference to FIGS. 3 and 4, the electronic device may generate a square image by reducing the first image 611 including the background 611a other than at least one object 611b based on a length of the relatively short side. As another example, similarly to that described with reference to FIG. 5, the electronic device may generate a square image by enlarging at least part of the background in the first image 611 including the background 611a other than the at least one object 611b.

According to an embodiment, the electronic device may generate a second image 612 having a square shape by composing the at least one object 611b with an image (or an image generated in a square shape) converted into a square shape. The electronic device may compose the separated at least one object 611b with an image (e.g., a square image including only a background) converted into a square shape. According to an embodiment, the electronic device may generate (or obtain) the second image 612 having a square shape from the first image 611 having a rectangular shape, without distortion to the at least one object 611b. Other images 613 and 614 shown in FIG. 6 illustrate that there are a plurality of objects 613a and 613b. In the same and/or similar manner as described above, the electronic device may separate a plurality of objects 613a and 613b from the rectangular image 613, may reduce or enlarge a background, and may convert the rectangular image 613 into a square image. The electronic device may compose the plurality of separated objects 613a and 613b with the background converted into a square shape.

Figure 7:
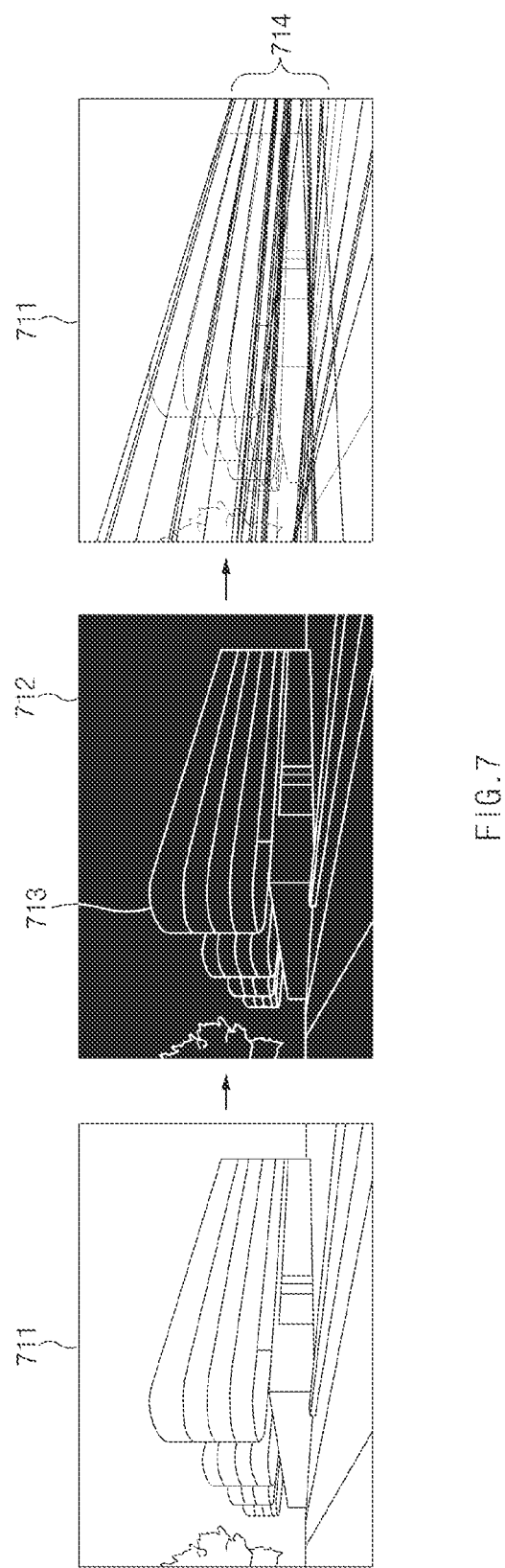
FIG. 7 is a diagram illustrating an example of an electronic device obtaining linear information indicating a characteristic of an image, according to various embodiments.

FIG. 7 is a diagram illustrating an example of an electronic device obtaining linear information indicating a characteristic of an image, according to various embodiments.

Referring to FIG. 7, an electronic device (e.g., the electronic device 101 of FIG. 1 or the electronic device 201 of FIG. 2) may obtain linear information indicating a characteristic of an image. The obtained linear information may be used determine an image conversion method for reducing a change in an object of an image when a rectangular image is converted into a circular or an edge-rounded image.

According to an embodiment, the electronic device may obtain a first image 711 corresponding to a rectangular raw image. Referring to FIG. 7, the first image 711 is illustrated as corresponding to a rectangular image. However, this is only an example. The first image 711 may correspond to a square image.

According to an embodiment, the electronic device may recognize (or obtain, sense, detect) an edge 713 indicating a boundary of at least one object included in the first image 711. For example, the edge 713 may refer to a boundary where a pixel value is rapidly changed in an image (e.g., the first image 711). According to an embodiment, the electronic device may recognize pixel values respectively corresponding to a plurality of pixels included in the first image 711. In various examples, the electronic device may convert the first image 711 to the second image 712 having black and white color and then may detect the edge 713. The electronic device may calculate the amount of change between pixel values of two or more adjacent pixels based on the recognized pixel values. The electronic device may recognize that a portion where the calculated change amount is not less than a threshold value is a boundary where a pixel value is changed rapidly. The electronic device may recognize that the portion where the calculated change amount is not less than the threshold value is the edge 713.

According to an embodiment, the electronic device may obtain linear information indicating the characteristic of the image (e.g., the first image 711) from the recognized (or acquired, sensed, detected) edge 713. For example, the linear information indicating the characteristic of the image may include linear information obtained from an image (e.g., the first image 711) or the edge 713 of the image through Hough transform. For example, the linear information indicating the characteristic of the image may include at least one line information or at least one straight line information, which is detected from an image (e.g., the first image 711) or the edge 713 of the image through the Hough transform. For example, the electronic device may generate (or obtain) straight line information indicating pixels, which have a straight line relationship with each other, from among a plurality of pixels (or a plurality of pixels of the edge 713) included in the image through the Hough transform.

Referring to FIG. 7, the linear information generated (or obtained) from the edge 713 is shown. According to an embodiment, the electronic device may generate (or obtain) linear information associated with at least one straight line 714 from the edge 713. In an embodiment, the linear information associated with the at least one straight line 714 may indicate the characteristic of the first image 711 (or the second image 712 having black and white color). For example, the linear information associated with the at least one straight line 714 may indicate a morphological characteristic of at least one object (or the background of the first image 711) included in the first image 711. In various embodiments, the above-described linear information may correspond to a Hough line generated from an image through the Hough transform.

According to an embodiment, when converting a rectangular image (e.g., the first image 711) into a circular or edge-rounded image, the electronic device may determine an image conversion method for reducing a change (or distortion) in the object of the image based on the generated (or obtained) linear information.

Figure 8:
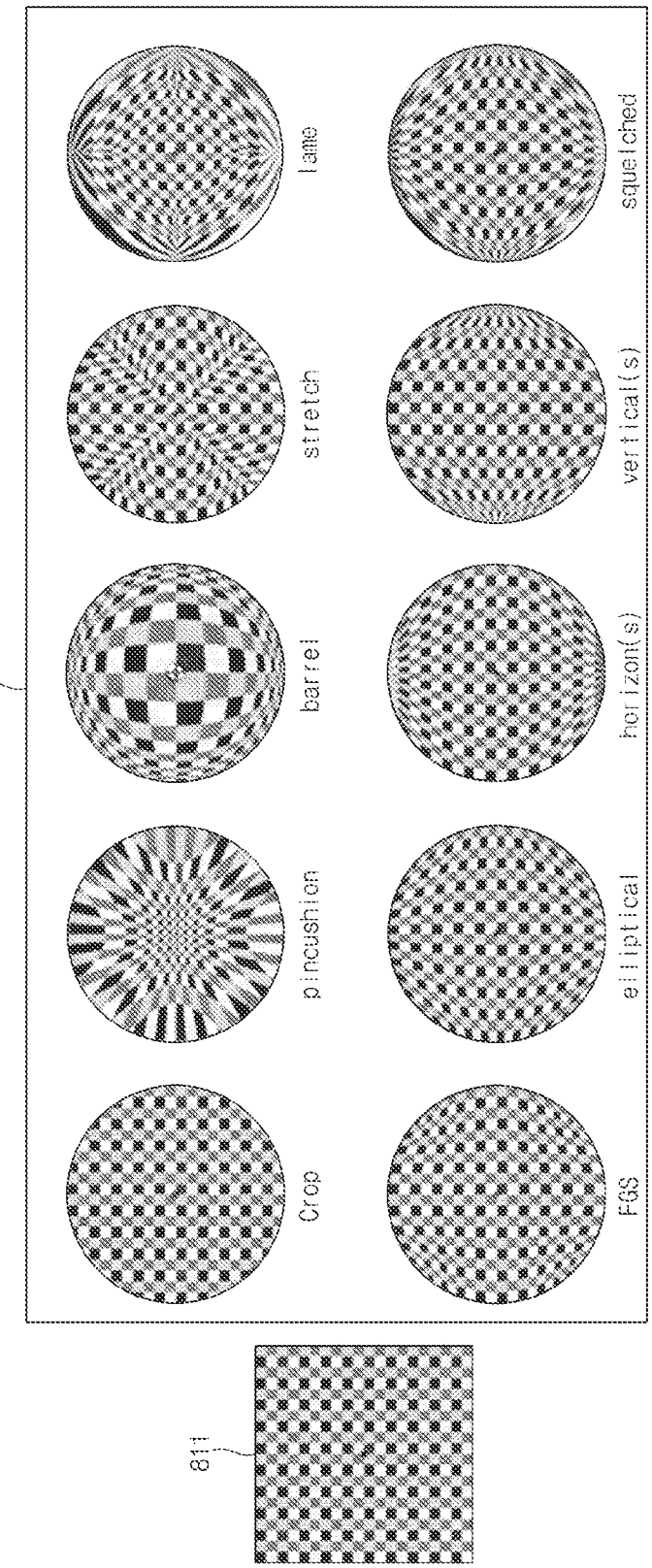
FIG. 8 illustrates an example image conversion method in which an electronic device converts a shape of an image from a rectangular shape to a circular shape or an edge-rounded shape, according to various embodiments.

FIG. 8 illustrates an example image conversion method in which an electronic device converts a shape of an image from a rectangular shape to a circular shape or an edge-rounded shape, according to various embodiments.

Referring to FIG. 8, a first image 811 obtained by an electronic device (e.g., the electronic device 101 of FIG. 1 or the electronic device 201 of FIG. 2) is shown. For example, the first image 811 may have a rectangular shape. In various embodiments, the first image 811 may have one of a rectangular shape or a square shape. Hereinafter, it is illustrated that the first image 811 has a square shape.

According to an embodiment, the electronic device may determine (or select) an image conversion method for converting the shape of the first image 811 into a circular or edge-rounded shape. In an embodiment, the electronic device may manage an equation for image conversion as a database. For example, the electronic device may store the equation for image conversion in a memory (e.g., the memory 130 of FIG. 1 or the memory 220 of FIG. 2). For example, the electronic device may store the database in the memory or an external memory. In various embodiments, the number of databases or the size of a database is not limited thereto. For example, the image conversion method may include a lens distortion correction (LDC) barrel distortion method, a superellipse method, or a squircle method. In addition to the above-described method, the electronic device may warp (or convert) a rectangular image into a circular or edge-rounded image using various equations for warping an image.

According to an embodiment, the electronic device may determine the equation for image conversion, in which the change of the object of the image is reduced when the first image 811 is converted into a circular image, in a databases 821 (e.g., crop, pincushion, barrel, stretch, lame, FGS, elliptical, horizon(s), vertical(s), squelched) including at least one equation for image conversion. According to an embodiment, the electronic device may determine the equation for image conversion, in which the distortion of the object of the image in the database 821 is reduced, based on linear information (e.g., Hough line) indicating the characteristic of the first image 811. An example in which an electronic device determines an equation for image conversion will be described with reference to FIG. 9.

Figure 9:
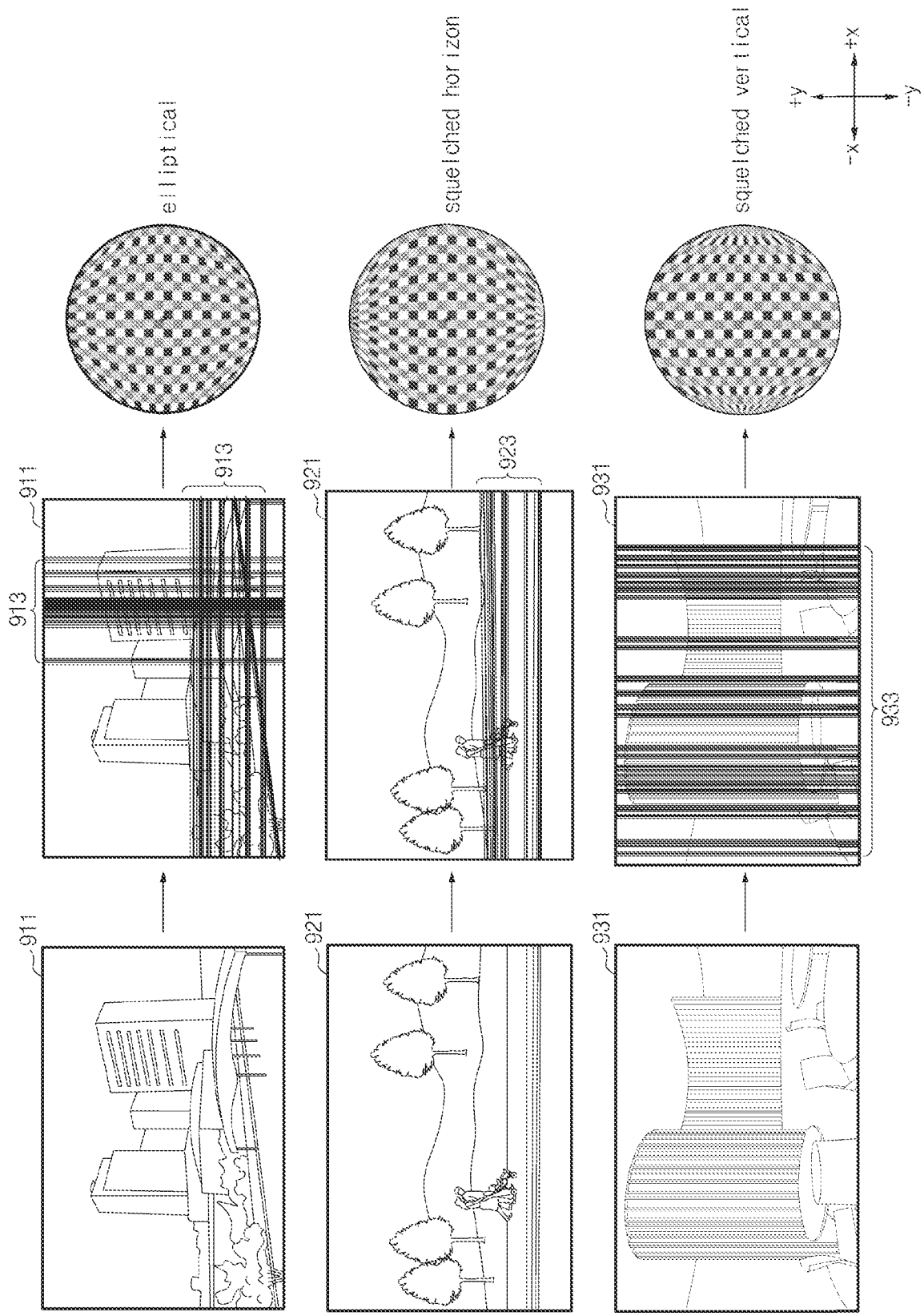
FIG. 9 illustrates an example of an electronic device determining an image conversion method by obtaining linear information from an image, according to various embodiments.

FIG. 9 illustrates an example of an electronic device determining an image conversion method by obtaining linear information from an image, according to various embodiments.

Referring to FIG. 9, an electronic device (e.g., the electronic device 101 of FIG. 1 or the electronic device 201 of FIG. 2) may obtain an image conversion method (or an equation for image conversion) based on linear information indicating a characteristic of an image. According to an embodiment, the electronic device may convert (or warp) a rectangular image into a circular or edge-rounded image using the image conversion method determined depending on the characteristic of an individual image, not applying a consistent image conversion method to different images.

Hereinafter, it is described that the electronic device converts (or warps) a rectangular image into a circular image. However, in various embodiments, the electronic device may convert a rectangular image into an edge-rounded shape.

According to an embodiment, the electronic device may obtain a first image 911. The first image 911 is illustrated as corresponding to a rectangular image. However, this is only an example. The first image 911 may correspond to a square image. For example, when the first image 911 is a rectangular image, the electronic device may perform a preprocessing of converting the rectangular image into a square image.

According to an embodiment, the electronic device may obtain linear information 913 indicating the characteristic of the first image 911 from the first image 911. According to an embodiment, the linear information 913 may include at least one line information or at least one straight line information, which is detected from the first image 911 or an edge obtained from the first image 911, through Hough transform. For example, the linear information 913 may correspond to a Hough line generated through the Hough transform from the first image 911.

According to an embodiment, when converting the first image 911 into a circular image, the electronic device may determine the image conversion method for reducing the distortion (or change) of the object of the image based on the obtained linear information 913. According to an embodiment, the electronic device may recognize the number of straight lines in a first orientation (e.g., x-axis direction) and the number of straight lines in a second orientation (e.g., y-axis direction), based on the obtained linear information 913 (e.g., Hough line). For example, the electronic device may recognize that a difference between the number of straight lines in the first orientation and the number of straight lines in the second orientation is not relatively large. According to an embodiment, the electronic device may determine that the image conversion method of the first image 911 is an elliptical conversion method, based on the recognized number of straight lines in the first orientation and the recognized number of straight lines in the second orientation. According to an embodiment, when a difference between the recognized number of straight lines in the first orientation and the recognized number of straight lines in the second orientation is less than a specified value, the electronic device may determine that the image conversion method of the first image 911 is an elliptical conversion method, and then may reduce the distortion of an object of an image that occurs when the first image 911 is converted into a circular image.

According to an embodiment, the electronic device may obtain a second image 921. The second image 921 is illustrated as corresponding to a rectangular image. However, this is only an example. The second image 921 may correspond to a square image. For example, when the second image 921 is a rectangular image, the electronic device may perform a preprocessing of converting the rectangular image into a square image.

According to an embodiment, the electronic device may obtain linear information 923 indicating the characteristic of the second image 921 from the second image 921. According to an embodiment, the linear information 923 may include at least one line information or at least one straight line information, which is detected from the second image 921 or an edge obtained from the second image 921, through Hough transform. For example, the linear information 923 may correspond to a Hough line generated through the Hough transform from the second image 921.

According to an embodiment, when converting the second image 921 into a circular image, the electronic device may determine the image conversion method for reducing the distortion (or change) of the object of the image based on the obtained linear information 923. According to an embodiment, the electronic device may recognize the number of straight lines in a first orientation (e.g., x-axis direction) and the number of straight lines in a second orientation (e.g., y-axis direction), based on the obtained linear information 923 (e.g., Hough line). For example, the electronic device may recognize only a straight line in the first orientation or may recognize that the number of straight lines in the first orientation is greater than the number of straight lines in the second orientation and a difference between the number of straight lines in the first orientation and the number of straight lines in the second orientation is not less than a specified value. According to an embodiment, the electronic device may determine that the image conversion method of the second image 921 is a squelched horizon conversion method, based on the recognized number of straight lines in the first orientation and the recognized number of straight lines in the second orientation. According to an embodiment, when a difference between the recognized number of straight lines in the first orientation and the recognized number of straight lines in the second orientation is not less than the specified value, and the number of straight lines in the first orientation is greater than the number of straight lines in the second orientation, the electronic device may determine that the image conversion method of the second image 921 is a squelched horizon conversion method, and then may reduce the distortion of an object of an image that occurs when the second image 921 is converted into a circular image.

According to an embodiment, the electronic device may obtain a third image 931. The third image 931 is illustrated as corresponding to a rectangular image. However, this is only an example. The third image 931 may correspond to a square image. For example, when the third image 931 is a rectangular image, the electronic device may perform a preprocessing of converting the rectangular image into a square image.

According to an embodiment, the electronic device may obtain linear information 933 indicating the characteristic of the third image 931 from the third image 931. According to an embodiment, the linear information 933 may include at least one line information or at least one straight line information, which is detected from the third image 931 or an edge obtained from the third image 931, through Hough transform. For example, the linear information 933 may correspond to a Hough line generated through the Hough transform from the third image 931.

According to an embodiment, when converting the third image 931 into a circular image, the electronic device may determine the image conversion method for reducing the distortion (or change) of the object of the image based on the obtained linear information 933. According to an embodiment, the electronic device may recognize the number of straight lines in a first orientation (e.g., x-axis direction) and the number of straight lines in a second orientation (e.g., y-axis direction), based on the obtained linear information 933 (e.g., Hough line). For example, the electronic device may recognize only a straight line in the second orientation or may recognize that the number of straight lines in the second orientation is greater than the number of straight lines in the first orientation and a difference between the number of straight lines in the first orientation and the number of straight lines in the second orientation is not less than a specified value. According to an embodiment, the electronic device may determine that the image conversion method of the third image 931 is a squelched vertical conversion method, based on the recognized number of straight lines in the first orientation and the recognized number of straight lines in the second orientation. According to an embodiment, when a difference between the recognized number of straight lines in the first orientation and the recognized number of straight lines in the second orientation is not less than the specified value, and the number of straight lines in the second orientation is greater than the number of straight lines in the first orientation, the electronic device may determine that the image conversion method of the third image 931 is a squelched vertical conversion method, and then may reduce the distortion of an object of an image that occurs when the third image 931 is converted into a circular image.

In various embodiments, the electronic device may obtain linear information (e.g., Hough line) from an image and may determine (or select) an image conversion method for reducing the change of an object of an image during the conversion to a circular image, based on the orientation of a line (or a straight line) included in the obtained linear information. In an embodiment, when the linear information includes a relatively large number of Hough lines corresponding to the first orientation (e.g., x-axis direction), the electronic device may determine an image conversion method for reducing the change in the first orientation. In another example, when the linear information includes a relatively large number of Hough lines corresponding to the second orientation (e.g., y-axis direction), the electronic device may determine an image conversion method for reducing the change in the second orientation. In another example, when the linear information includes both Hough lines corresponding to the first orientation and Hough lines corresponding to the second orientation, or the difference between the number of Hough lines corresponding to the first orientation and the number of Hough lines corresponding to the second orientation is less than a specified value, the electronic device may determine an image conversion method in which a change in the first orientation is similar to a change in the second orientation. The linear information (913, 933) shown in FIG. 9 is only an example for convenience of description. The orientation and number (e.g., the number of lines included in linear information) of linear information may not be construed as being limited to those shown in FIG. 9.

According to various embodiments, the electronic device may determine an image conversion method for the first image 911, the second image 921, and the third image 931, which are described above, using a machine learning model. According to an embodiment, the electronic device may learn various images using the machine learning model. According to an embodiment, the electronic device may learn characteristics of an image using the machine learning model and may determine an image conversion method for reducing the distortion of the object of the image during image conversion (or warping) depending on the learned result.

According to an embodiment, the electronic device may learn an image conversion method for reducing the distortion of the object of the image according to linear information (e.g., Hough line) of an image using the machine learning model. According to an embodiment, the electronic device may determine an image conversion method for reducing the distortion of the object of the image during image conversion (or warping) depending on the learned result using the machine learning model. For example, the electronic device may convert the first image 911 to a circular image in an elliptical conversion method determined using the machine learning model. For example, the electronic device may convert the second image 921 to a circular image in a squelched horizon conversion method determined using the machine learning model. For example, the electronic device may convert the third image 931 to a circular image in a squelched vertical conversion method determined using the machine learning model.

Figure 10:
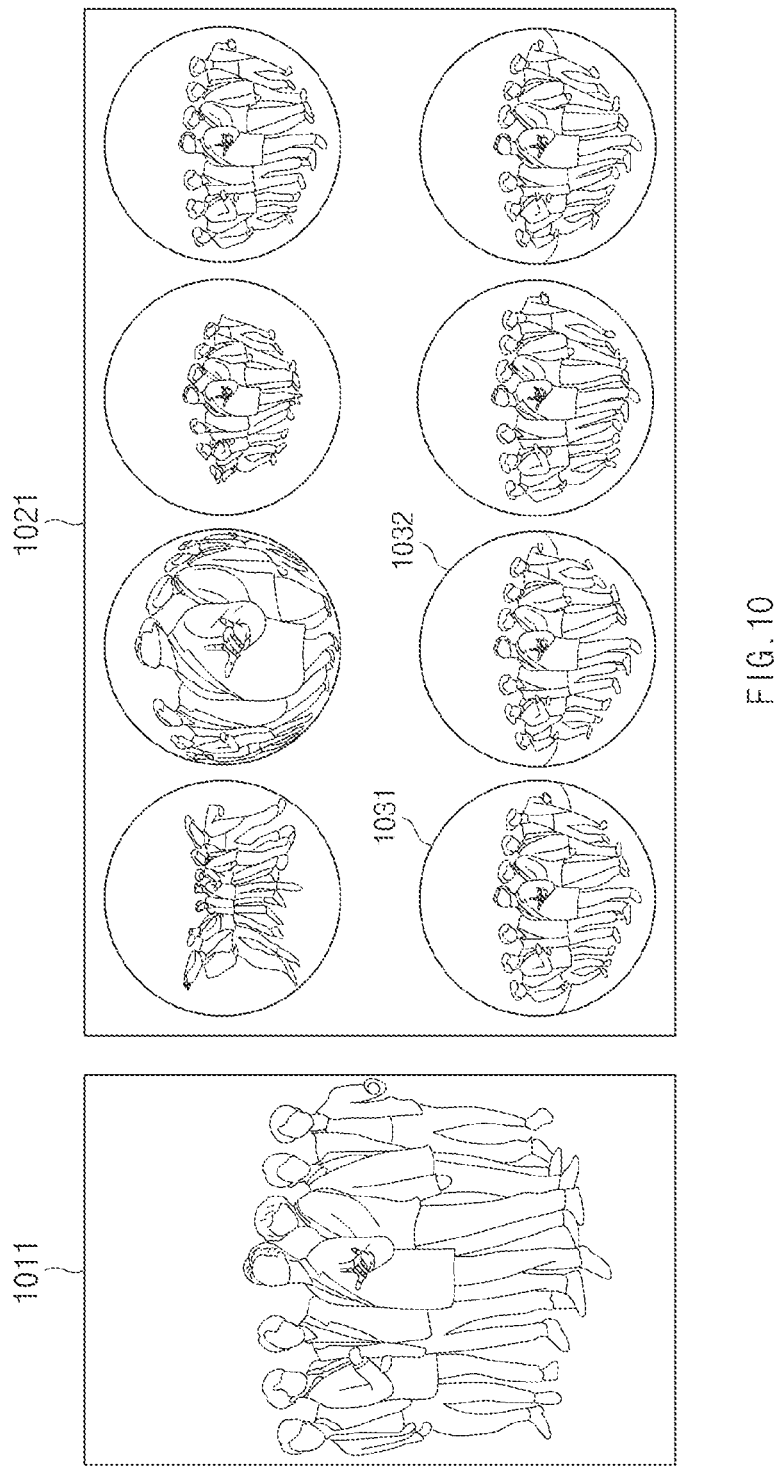
FIG. 10 illustrates an example of an electronic device converting a rectangular image into a circular image using an image conversion method determined based on linear information, according to various embodiments.

FIG. 10 illustrates an example of an electronic device converting a rectangular image into a circular image using an image conversion method determined based on linear information, according to various embodiments.

Referring to FIG. 10, an electronic device (e.g., the electronic device 101 of FIG. 1 or the electronic device 201 of FIG. 2) may obtain a first image 1011. For example, the first image 1011 may be a raw image. The first image 1011 is illustrated as corresponding to a rectangular image. However, in various embodiments, the first image 1011 may correspond to a square image. For example, when the first image 1011 is a rectangular image, the electronic device may perform a preprocessing of converting the rectangular image into a square image.

According to an embodiment, the electronic device may determine an image conversion method for converting the first image 1011 having a quadrangle (e.g., rectangle or square) into an image having a circular or edge-rounded shape. Hereinafter, it is described that the electronic device converts the first image 1011 having a rectangle into the first image 1011 having a circle.

According to an embodiment, the electronic device may obtain linear information indicating the characteristic of the first image 1011. According to an embodiment, the linear information may include at least one line information or at least one straight line information, which is detected from the first image 1011 or an edge obtained from the first image 1011, through Hough transform. For example, the linear information may correspond to a Hough line generated through the Hough transform from the first image 1011.

According to an embodiment, the electronic device may include a database including at least one equation for image conversion. For example, the electronic device may store the database including at least one equation for image conversion in a memory (e.g., the memory 130 of FIG. 1 and the memory 220 of FIG. 2). Referring to FIG. 10, an example 1021 in which the electronic device converts (or warps) the first image 1011 using various image conversion methods stored in a database is illustrated. According to an embodiment, when converting the first image 1011 into a circular image, the electronic device may determine the image conversion method for reducing the distortion (or change) of the object of the image based on the obtained linear information. According to an embodiment, the electronic device may convert the first image 1011 into a second image 1031 or a third image 1032 in an image conversion method determined based on the linear information of the first image 1011.

According to an embodiment, the electronic device may display the second image 1031 or the third image 1032 on a display (e.g., the display module 160 of FIG. 1 or the display 210 of FIG. 2). According to an embodiment, the display area of a display may have a circular or edge-rounded shape. According to an embodiment, the electronic device may provide the second image 1031 or the third image 1032, which has relatively little visual distortion, to a user watching the display having a circular display area.

Figure 11:
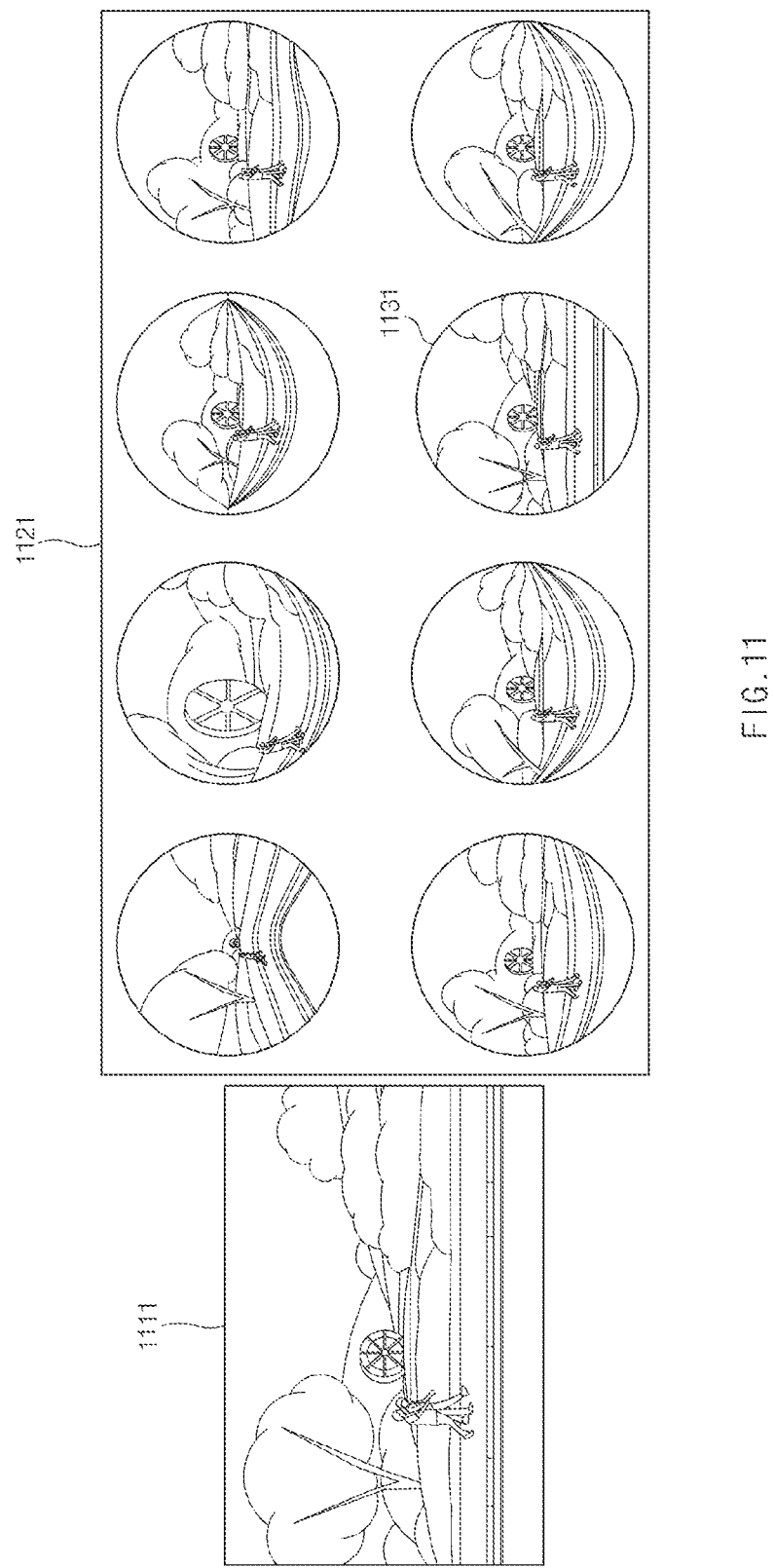
FIG. 11 illustrates an example of an electronic device converting a rectangular image into a circular image using an image conversion method determined based on linear information, according to various embodiments.

FIG. 11 illustrates an example of an electronic device converting a rectangular image into a circular image using an image conversion method determined based on linear information, according to various embodiments.

Referring to FIG. 11, an electronic device (e.g., the electronic device 101 of FIG. 1 or the electronic device 201 of FIG. 2) may obtain a first image 1111. For example, the first image 1111 may be a raw image. The first image 1111 is illustrated as corresponding to a rectangular image. However, in various embodiments, the first image 1111 may correspond to a square image. For example, when the first image 1111 is a rectangular image, the electronic device may perform a preprocessing of converting the rectangular image into a square image.

According to an embodiment, the electronic device may determine an image conversion method for converting the first image 1111 having a quadrangle (e.g., rectangle or square) into an image having a circular or edge-rounded shape. Hereinafter, it is described that the electronic device converts the first image 1111 having a rectangle into the first image 1111 having a circle.

According to an embodiment, the electronic device may obtain linear information indicating the characteristic of the first image 1111. According to an embodiment, the linear information may include at least one line information or at least one straight line information, which is detected from the first image 1111 or an edge obtained from the first image 1111, through Hough transform. For example, the linear information may correspond to a Hough line generated through the Hough transform from the first image 1111.

According to an embodiment, the electronic device may include a database including at least one equation for image conversion. For example, the electronic device may store the database including at least one equation for image conversion in a memory (e.g., the memory 130 of FIG. 1 and the memory 220 of FIG. 2). Referring to FIG. 11, an example 1121 in which the electronic device converts (or warps) the first image 1111 using various image conversion methods stored in a database is illustrated. According to an embodiment, when converting the first image 1111 into a circular image, the electronic device may determine the image conversion method for reducing the distortion (or change) of the object of the image based on the obtained linear information. According to an embodiment, the electronic device may convert the first image 1111 into a second image 1131 in an image conversion method determined based on the linear information of the first image 1111.

According to an embodiment, the electronic device may display the second image 1131 on a display (e.g., the display module 160 of FIG. 1 or the display 210 of FIG. 2). According to an embodiment, the display area of a display may have a circular or edge-rounded shape. According to an embodiment, the electronic device may provide the second image 1131, which has relatively little visual distortion, to a user watching the display having a circular display area.

FIG. 12 illustrates an example of an electronic device converting a rectangular image into a circular image using an image conversion method determined based on linear information, according to various embodiments.

Referring to FIG. 12, an electronic device (e.g., the electronic device 101 of FIG. 1 or the electronic device 201 of FIG. 2) may obtain a first image 1211. For example, the first image 1211 may be a raw image. The first image 1211 is illustrated as corresponding to a rectangular image. However, in various embodiments, the first image 1211 may correspond to a square image. For example, when the first image 1211 is a rectangular image, the electronic device may perform a preprocessing of converting the rectangular image into a square image.

According to an embodiment, the electronic device may determine an image conversion method for converting the first image 1211 having a quadrangle (e.g., rectangle or square) into an image having a circular or edge-rounded shape. Hereinafter, it is described that the electronic device converts the first image 1211 having a rectangle into the first image 1211 having a circle.

According to an embodiment, the electronic device may obtain linear information indicating the characteristic of the first image 1211. According to an embodiment, the linear information may include at least one line information or at least one straight line information, which is detected from the first image 1211 or an edge obtained from the first image 1211, through Hough transform. For example, the linear information may correspond to a Hough line generated through the Hough transform from the first image 1211.

According to an embodiment, the electronic device may include a database including at least one equation for image conversion. For example, the electronic device may store the database including at least one equation for image conversion in a memory (e.g., the memory 130 of FIG. 1 and the memory 220 of FIG. 2). Referring to FIG. 12, an example 1221 in which the electronic device converts (or warps) the first image 1211 using various image conversion methods stored in a database is illustrated. According to an embodiment, when converting the first image 1211 into a circular image, the electronic device may determine the image conversion method for reducing the distortion (or change) of the object of the image based on the obtained linear information. According to an embodiment, the electronic device may convert the first image 1211 into a second image 1231 in an image conversion method determined based on the linear information of the first image 1211.

According to an embodiment, the electronic device may display the second image 1231 on a display (e.g., the display module 160 of FIG. 1 or the display 210 of FIG. 2). According to an embodiment, the display area of a display may have a circular or edge-rounded shape. According to an embodiment, the electronic device may provide the second image 1231, which has relatively little visual distortion, to a user watching the display having a circular display area.

Figure 13:
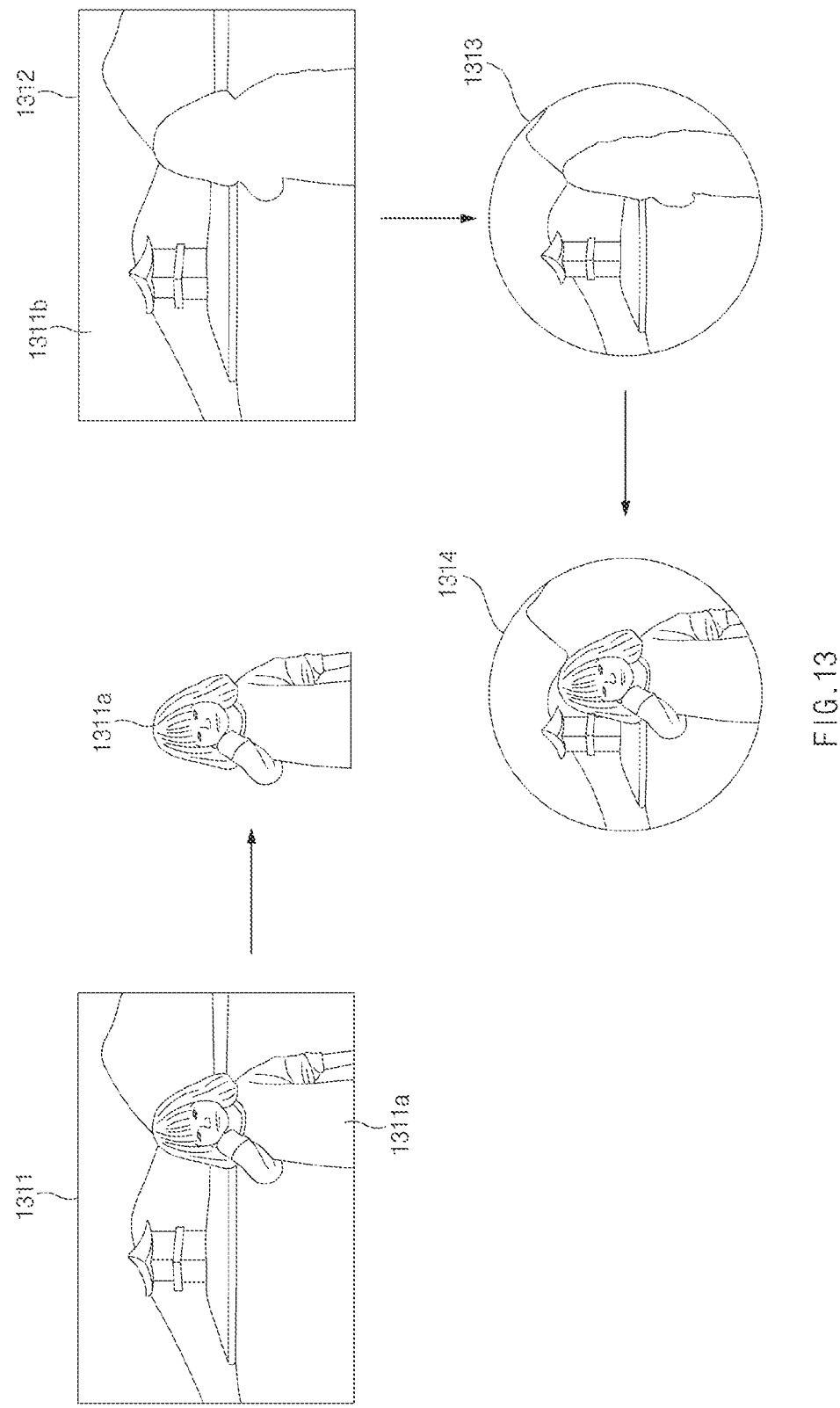
FIG. 13 illustrates an example of an electronic device converting a rectangular image into a circular image by separating a background and an object, according to various embodiments.

FIG. 13 illustrates an example of an electronic device converting a rectangular image into a circular image by separating a background and an object, according to various embodiments.

Referring to FIG. 13, an electronic device (e.g., the electronic device 101 of FIG. 1 or the electronic device 201 of FIG. 2) may obtain a first image 1311. For example, the first image 1311 may be a raw image. The first image 1311 is illustrated as corresponding to a rectangular image. However, in various embodiments, the first image 1311 may correspond to a square image. For example, when the first image 1311 is a rectangular image, the electronic device may perform a preprocessing of converting the rectangular image into a square image.

According to an embodiment, the electronic device may separate (or distinguish) an object 1311a and a background 1311b from the first image 1311. According to an embodiment, the electronic device may individually recognize the object 1311a and the background 1311b from the first image 1311. In an embodiment, the electronic device may recognize the object 1311a and the background 1311b, which are included in the first image 1311. The electronic device may generate a second image 1312 that is excluded by separating the recognized object 1311a from the first image 1311. The second image 1312 may include the background 1311b.

According to an embodiment, the electronic device may obtain linear information indicating the characteristic of the second image 1312 from the second image 1312 excluding the object 1311a. For example, the electronic device may obtain linear information indicating the characteristic of the background 1311b. According to an embodiment, the linear information may include at least one line information or at least one straight line information, which is detected from the second image 1312 or an edge obtained from the second image 1312, through Hough transform. For example, the linear information may correspond to a Hough line generated through the Hough transform from the second image 1312.

According to an embodiment, when converting the second image 1312 into a circular image, the electronic device may determine the image conversion method for reducing the distortion (or change) of the background 1311b of the image based on the obtained linear information. It is described with reference to the drawings that an electronic device determines an image conversion method for reducing distortion (or change) based on linear information, and thus a redundant description will be omitted. According to an embodiment, the electronic device may convert (or warp) the second image 1312 into a third image 1313 having a circular shape in the determined image conversion method.

According to an embodiment, the electronic device may compose the object 1311a and the third image 1313. According to an embodiment, the electronic device may generate a fourth image 1314 by composing the object 1311a with the third image 1313.

According to an embodiment, the electronic device may display the generated fourth image 1314 on a display (e.g., the display module 160 of FIG. 1 or the display 210 of FIG. 2). According to an embodiment, the display area of a display may have a circular or edge-rounded shape. According to an embodiment, the object 1311a may not be converted (or warped) by the determined image conversion method, and the fourth image 1314 may correspond to an image converted (or warped) by an image conversion method that determines only the background 1311b. According to an embodiment, the electronic device may provide the fourth image 1314, which has relatively little visual distortion, to a user watching the display having a circular display area.

Figure 14:
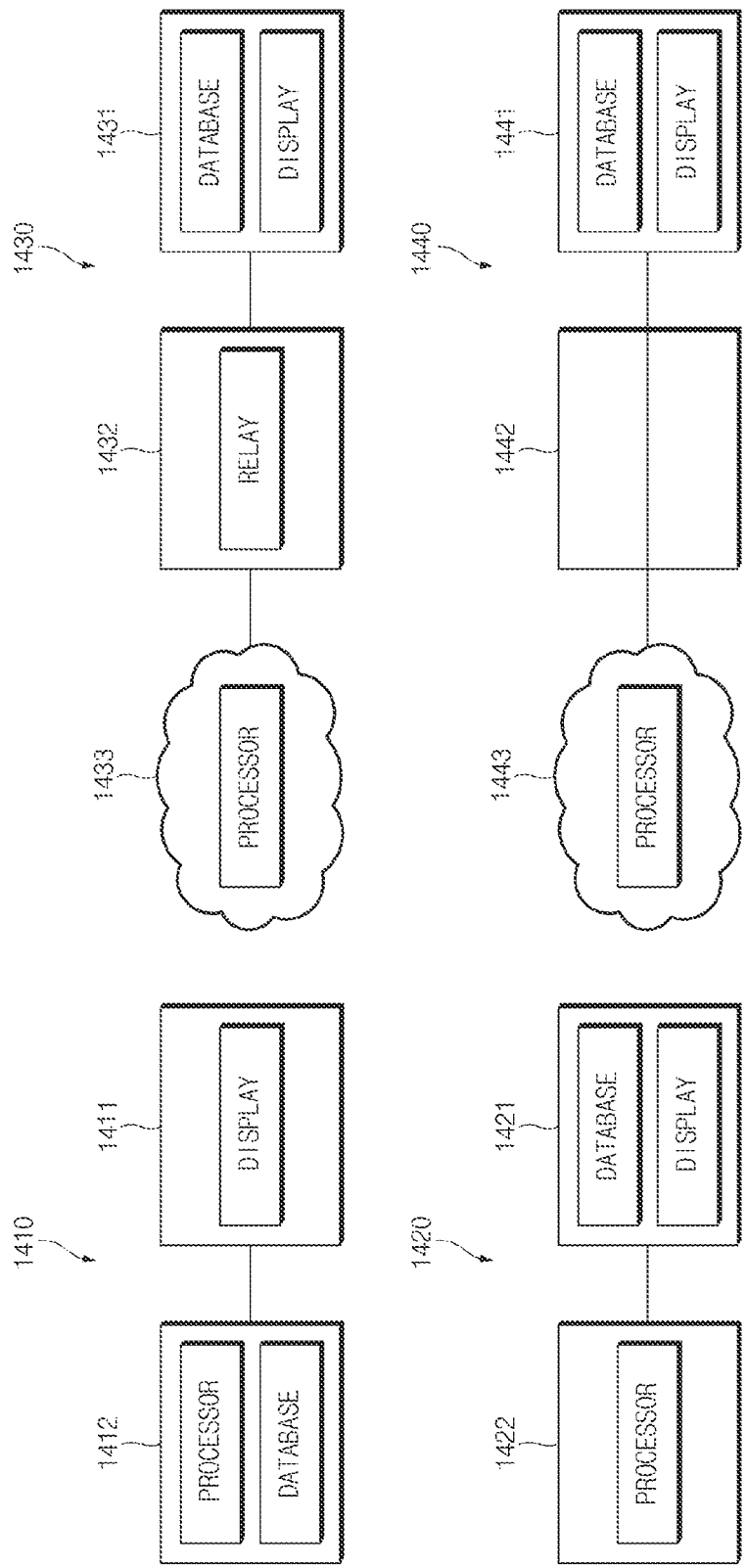
FIG. 14 illustrates an example of converting a rectangular image into a circular image using an electronic device and an external electronic device, according to various embodiments.

FIG. 14 illustrates an example operation of converting a rectangular image into a circular image using an electronic device and an external electronic device, according to various embodiments.

In various embodiments, an operation of converting a rectangular image into a circular image based on the characteristic of an image by an electronic device (e.g., the electronic device 101 of FIG. 1 or the electronic device 201 of FIG. 2) may be performed using two or more electronic devices. Referring to FIG. 14, a first system 1410, a second system 1420, a third system 1430, and a fourth system 1440 are illustrated.

Referring to the first system 1410, an electronic device 1411 and an external electronic device 1412 are illustrated. For example, the electronic device 1411 may be a wearable device (e.g., a smart watch) capable of being worn on a user's body. For example, the external electronic device 1412 may be a portable communication device (e.g., a smartphone).

According to an embodiment, the external electronic device 1412 may include a database. In an embodiment, the database may include at least one equation for image conversion. In an embodiment, the database may include at least one image. For example, the database may include an image of a quadrangle (e.g., rectangle or square) to be transformed.

According to an embodiment, the external electronic device 1412 may include a processor including various processing circuitry that converts a rectangular image into a circular (or edge-rounded) image. Various embodiments in which a processor of the external electronic device 1412 transforms (or warps) the shape of an image may be the same or substantially the same as those described with reference to the drawings. Hereinafter, operations described as being performed by the external electronic device 1412 may be referred to as being performed by the processor of the external electronic device 1412.

According to an embodiment, the external electronic device 1412 may obtain a rectangular image, of which the shape is to be transformed, from a database. According to an embodiment, the external electronic device 1412 may obtain linear information indicating the characteristic of the rectangular image from the obtained rectangular image. According to an embodiment, the linear information may include at least one line information or at least one straight line information, which is detected from an image or an edge obtained from the image, through Hough transform. For example, the linear information may correspond to a Hough line generated through the Hough transform from the image. In various embodiments, the external electronic device 1412 may perform a preprocessing of converting (or resizing) a rectangular image into a square image and then may obtain linear information from the converted square image.

According to an embodiment, when converting a rectangular image into a circular image, the external electronic device 1412 may determine the image conversion method, which allows the distortion (or change) of the object of the image to be reduced, based on the obtained linear information. The external electronic device 1412 may determine (or select) at least one equation (or image conversion method) for image conversion, which allows the distortion (or change) of an object of an image to be reduced, from a database. According to an embodiment, the external electronic device 1412 may convert (or warp) a rectangular image into a circular image in an image conversion method determined based on linear information of the image. The external electronic device 1412 may provide a circular image to the electronic device 1411.

According to an embodiment, the electronic device 1411 may include a circular display (e.g., the display module 160 of FIG. 1 or the display 210 of FIG. 2). The electronic device 1411 may display the circular image received from the external electronic device 1412 on the display.

Referring to the second system 1420, an electronic device 1421 and an external electronic device 1422 are illustrated. For example, the electronic device 1421 may be a wearable device (e.g., a smart watch) capable of being worn on a user's body. For example, the external electronic device 1422 may be a portable communication device (e.g., a smartphone).

According to an embodiment, the electronic device 1421 may include a database. In an embodiment, the database may include at least one equation for image conversion. In an embodiment, the database may include at least one image. For example, the database may include an image of a quadrangle (e.g., rectangle or square) to be transformed.

According to an embodiment, the external electronic device 1422 may include a processor including various processing circuitry that converts a rectangular image into a circular (or edge-rounded) image. Hereinafter, operations described as being performed by the external electronic device 1422 may be referred to as being performed by the processor of the external electronic device 1422.

According to an embodiment, the external electronic device 1422 may obtain a rectangular image, of which the shape is to be transformed, from the database included in the electronic device 1421. According to an embodiment, the external electronic device 1422 may obtain linear information indicating the characteristic of the rectangular image from the rectangular image. According to an embodiment, the linear information may include at least one line information or at least one straight line information, which is detected from an image or an edge obtained from the image, through Hough transform. For example, the linear information may correspond to a Hough line generated through the Hough transform from the image. In various embodiments, the external electronic device 1422 may perform a preprocessing of converting (or resizing) a rectangular image into a square image and then may obtain linear information from the converted square image.

According to an embodiment, when converting a rectangular image into a circular image, the external electronic device 1422 may determine the image conversion method, which allows the distortion (or change) of the object of the image to be reduced, based on the obtained linear information. The external electronic device 1422 may determine (or select) at least one equation (or image conversion method) for image conversion, which allows the distortion (or change) of an object of an image to be reduced, from a database of the electronic device 1421. According to an embodiment, the external electronic device 1422 may convert (or warp) a rectangular image into a circular image in an image conversion method determined based on linear information of the image. The external electronic device 1422 may provide a circular image to the electronic device 1421. The electronic device 1421 may store the received circular image in the database.

According to an embodiment, the electronic device 1421 may include a circular display (e.g., the display module 160 of FIG. 1 or the display 210 of FIG. 2). The electronic device 1421 may obtain the circular image, which is received from the external electronic device 1422, from the database. The electronic device 1421 may display the obtained circular image on the display.

Referring to the third system 1430, an electronic device 1431, a first external electronic device 1432, and a second external electronic device 1433 are illustrated. For example, the electronic device 1431 may be a wearable device (e.g., a smart watch) capable of being worn on a user's body. For example, the first external electronic device 1432 may be a portable communication device (e.g., a smartphone). For example, the second external electronic device 1433 may be an external server.

According to an embodiment, the second external electronic device 1433 may include a processor including various processing circuitry that converts a rectangular image into a circular (or edge-rounded) image. Hereinafter, operations described as being performed by the second external electronic device 1433 may be referred to as being performed by a processor of the second external electronic device 1433.

According to an embodiment, the electronic device 1431 may include a database. In an embodiment, the database may include at least one equation for image conversion. In an embodiment, the database may include at least one image. For example, the database may include an image of a quadrangle (e.g., rectangle or square) to be transformed.

According to an embodiment, the first external electronic device 1432 may obtain a rectangular image, of which the shape is to be transformed, from the database included in the electronic device 1431. According to an embodiment, the first external electronic device 1432 may include a relay for transmitting and receiving various pieces of data. The first external electronic device 1432 may provide the obtained rectangular image to the second external electronic device 1433. According to an embodiment, the second external electronic device 1433 may obtain linear information indicating the characteristic of the rectangular image from the rectangular image. According to an embodiment, the linear information may include at least one line information or at least one straight line information, which is detected from an image or an edge obtained from the image, through Hough transform. For example, the linear information may correspond to a Hough line generated through the Hough transform from the image. In various embodiments, the second external electronic device 1433 may perform a preprocessing of converting (or resizing) a rectangular image into a square image and then may obtain linear information from the converted square image.

According to an embodiment, when converting a rectangular image into a circular image, the second external electronic device 1433 may determine the image conversion method, which allows the distortion (or change) of the object of the image to be reduced, based on the obtained linear information. The second external electronic device 1433 may determine (or select) at least one equation (or image conversion method) for image conversion, which allows the distortion (or change) of an object of an image to be reduced, from a database of the electronic device 1431. For example, the second external electronic device 1433 may receive at least one equation for image conversion determined based on linear information of the image from the electronic device 1431 through the first external electronic device 1432.

According to an embodiment, the second external electronic device 1433 may convert (or warp) a rectangular image into a circular image in an image conversion method determined based on linear information of the image. The second external electronic device 1433 may provide a circular image to the first electronic device 1432. The first external electronic device may provide the received circular image to the electronic device 1431. The electronic device 1431 may store the received circular image in the database.

According to an embodiment, the electronic device 1431 may include a circular display (e.g., the display module 160 of FIG. 1 or the display 210 of FIG. 2). The electronic device 1431 may obtain the circular image, which is received from the first external electronic device 1432, from the database. The electronic device 1431 may display the obtained circular image on the display.

Referring to the fourth system 1440, an electronic device 1441, a first external electronic device 1442, and a second external electronic device 1443 are illustrated. For example, the electronic device 1441 may be a wearable device (e.g., a smart watch) capable of being worn on a user's body. For example, the first external electronic device 1442 may be a portable communication device (e.g., a smartphone). For example, the second external electronic device 1443 may be an external server.

According to an embodiment, the electronic device 1441 may directly communicate with the second external electronic device 1443 without going through the first external electronic device 1442. According to an embodiment, the electronic device 1441 may directly transmit/receive various pieces of data (e.g., images) to and from the second external electronic device 1443 without going through the first external electronic device 1442.

According to an embodiment, the second external electronic device 1443 may include a processor that converts a rectangular image into a circular (or edge-rounded) image. Hereinafter, operations described as being performed by the second external electronic device 1443 may be referred to as being performed by the processor of the second external electronic device 1443.

According to an embodiment, the electronic device 1441 may include a database. In an embodiment, the database may include at least one equation for image conversion. In an embodiment, the database may include at least one image. For example, the database may include an image of a quadrangle (e.g., rectangle or square) to be transformed.

According to an embodiment, the second external electronic device 1443 may obtain a rectangular image, of which the shape is to be transformed, from a database included in the electronic device 1441. According to an embodiment, the second external electronic device 1443 may obtain linear information indicating the characteristic of the rectangular image from the rectangular image. According to an embodiment, the linear information may include at least one line information or at least one straight line information, which is detected from an image or an edge obtained from the image, through Hough transform. For example, the linear information may correspond to a Hough line generated through the Hough transform from the image. In various embodiments, the second external electronic device 1443 may perform a preprocessing of converting (or resizing) a rectangular image into a square image and then may obtain linear information from the converted square image.

According to an embodiment, when converting a rectangular image into a circular image, the second external electronic device 1443 may determine the image conversion method, which allows the distortion (or change) of the object of the image to be reduced, based on the obtained linear information. The second external electronic device 1443 may determine (or select) at least one equation (or image conversion method) for image conversion, which allows the distortion (or change) of an object of an image to be reduced, from a database of the electronic device 1441. According to an embodiment, the second external electronic device 1443 may convert (or warp) a rectangular image into a circular image in an image conversion method determined based on linear information of the image. The second external electronic device 1443 may provide a circular image to the electronic device 1441. The electronic device 1441 may store the received circular image in the database.

According to an embodiment, the electronic device 1441 may include a circular display (e.g., the display module 160 of FIG. 1 or the display 210 of FIG. 2). The electronic device 1441 may obtain the circular image, which is received from the second external electronic device 1443, from the database. The electronic device 1441 may display the obtained circular image on the display.

According to an embodiment of the disclosure, an electronic device (e.g., the electronic device 101 of FIG. 1, the electronic device 201 of FIG. 2, the electronic device (1411, 1421, 1431, 1441) of FIG. 14, the first external electronic device (1412, 1422), or the second external electronic device (1433, 1443)) may include: a display (e.g., the display module 160 of FIG. 1 or the display 210 of FIG. 2), a memory (e.g., the memory 130 of FIG. 1 and the memory 220 of FIG. 2), and a processor (e.g., the processor 120 of FIG. 1, the processor 230 of FIG. 2, or the processor of FIG. 14) operatively connected to the display and the memory. According to an embodiment, the memory may store instructions that, when executed, cause the processor to: obtain a first image of a first shape, obtain linear information indicating a morphological characteristic of an object in the first image of the first shape, determine a conversion method for converting the first image of the first shape into an image of a second shape based on the obtained linear information, convert the first image of the first shape into a second image of the second shape based on the determined conversion method, and display the converted second image of the second shape on the display.

According to an embodiment, the first shape may correspond to a rectangular shape. The instructions, when executed, may cause the processor to convert the first image corresponding to the rectangular shape into a third image corresponding to a third shape and to obtain the linear information from the third image.

According to an embodiment, the instructions, when executed, may cause the processor to: individually recognize a background and an object, which are included in the first image corresponding to the rectangular shape, convert the recognized background other than the recognized object into a background of the third shape by reducing or enlarging the recognized background other than the recognized object, and generate the third image by composing the recognized object with the converted background of the third shape. The third shape may correspond to a square shape.

According to an embodiment, the instructions, when executed, may cause the processor to: obtain a feature of the first image corresponding to the first shape and individually recognize the background and the object based on the obtained feature.

According to an embodiment, the instructions, when executed, may cause the processor to: obtain the linear information through Hough transform. The linear information may include information about a Hough line.

According to an embodiment, the instructions, when executed, may cause the processor to: determine the conversion method, which reduces a change between the first image of the first shape and the second image of the second shape based on the obtained linear information.

According to an embodiment, the instructions, when executed, may cause the processor to: individually recognize a background and an object, which are included in the first image of the first shape, separate the recognized object from the first image of the first shape, and obtain the linear information indicating a morphological characteristic of the recognized background.

According to an embodiment, the instructions, when executed, may cause the processor to: determine the conversion method based on the linear information indicating the morphological characteristic of the recognized background and convert an image excluding the separated object, into an image of the second shape based on the determined conversion method.

According to an embodiment, the instructions, when executed, may cause the processor to: generate the second image of the second shape by composing the separated object with the converted image of the second shape.

According to an embodiment, the instructions, when executed, may cause the processor to: individually recognize a background and an object, which are included in the first image of the first shape, generate a third image obtained by separating the recognized object from the first image of the first shape, convert the generated third image into a fourth image of the second shape by obtaining the linear information from the generated third image, and to display a fifth image of the second shape obtained by composing the recognized object with the converted fourth image, on the display.

According to an embodiment, the memory may be configured to store a database including at least one equation for converting an image of the first shape into an image of the second shape.

According to an embodiment, the instructions, when executed, may cause the processor to learn a morphological characteristic of an object in the first image using a machine learning model and determine the conversion method based on the learned result.

According to an embodiment, the instructions, when executed, may cause the processor to obtain the linear information from at least one external electronic device.

According to an embodiment, the display may include a circular display area. The instructions, when executed, may cause the processor to display the second image of the second shape in the circular display area.

According to an embodiment, the instructions, when executed, may cause the processor to: convert the first image of the first shape into a gray scale, recognize an edge indicating a boundary of at least one object included in the first image, from the first image converted into the grayscale, and obtain the linear information corresponding to at least one straight line based on the recognized edge.

Figure 15:
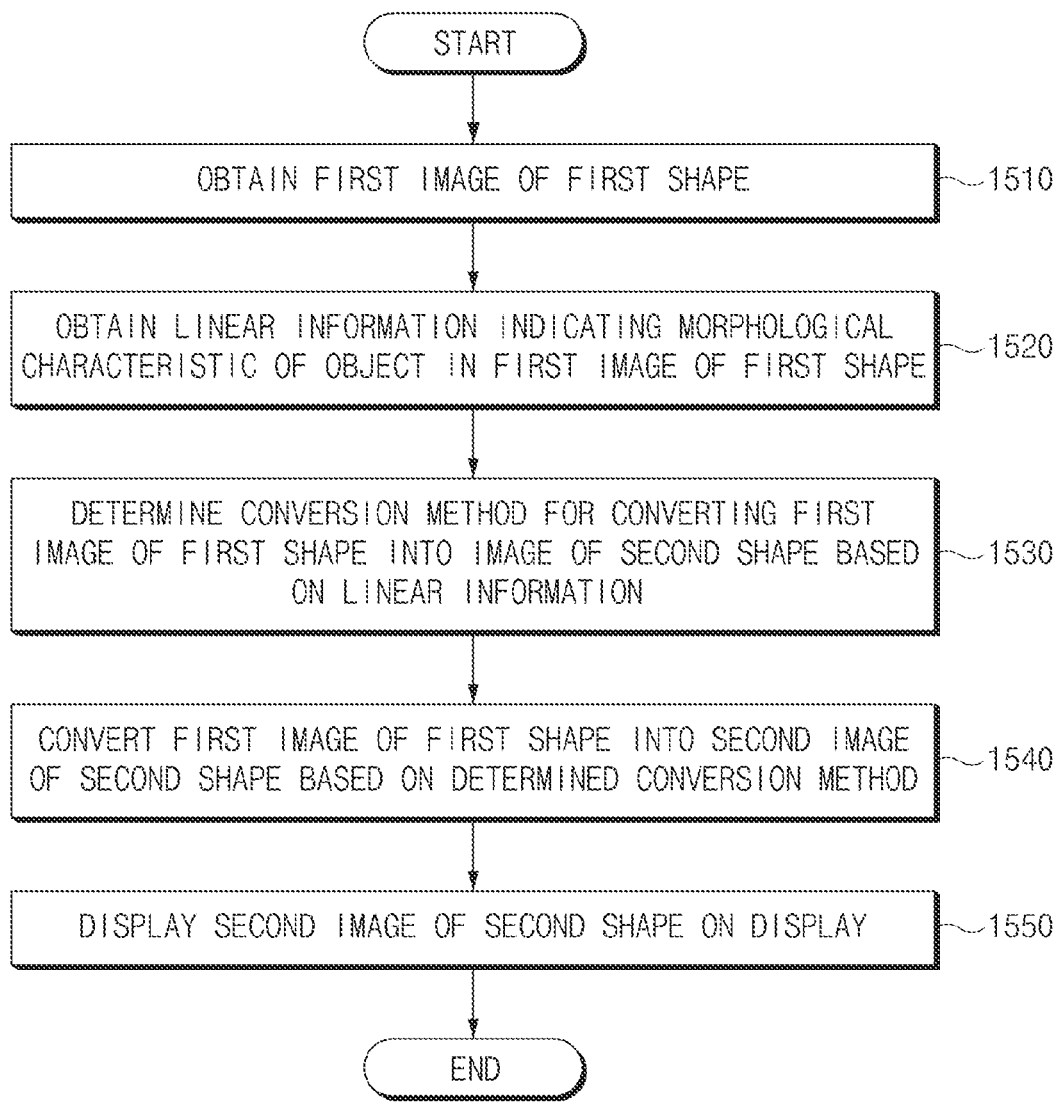
FIG. 15 is a flowchart illustrating an example method of operating a processor of an electronic device, according to various embodiments.

FIG. 15 is a flowchart illustrating an example method of operating a processor of an electronic device, according to various embodiments.

According to an embodiment, in operation 1510, an electronic device (e.g., the electronic device 101 of FIG. 1, the electronic device 201 of FIG. 2, the electronic device (1411, 1421, 1431, 1441) of FIG. 14, the first external electronic device (1412, 1422), or the second external electronic device (1433, 1443)) may obtain a first image of a first shape. For example, the first image of the first shape may have a rectangular shape or a square shape. For example, the electronic device may obtain the first rectangular image from a database (or a memory (e.g., the memory 130 of FIG. 1 or the memory 220 of FIG. 2)) including at least one image. Hereinafter, operations described as being performed by the electronic device may be understood as being performed by a processor (e.g., the processor 120 of FIG. 1, the processor 230 of FIG. 2, or the processor of FIG. 14).

According to an embodiment, in operation 1520, the electronic device may obtain linear information indicating the morphological characteristic of an object in the first image of the first shape. In various examples, the linear information may indicate the morphological characteristic of a background in the first image of the first shape (e.g., rectangle). According to an embodiment, the linear information may include at least one line information or at least one straight line information, which is detected from the first image (or an edge obtained from the first image) of the first shape (e.g., rectangle), through Hough transform. For example, the linear information may correspond to a Hough line generated through the Hough transform from the first rectangular image.

According to an embodiment, in operation 1530, the electronic device may determine a conversion method for converting the first image of the first shape into an image of the second shape based on the obtained linear information. In an embodiment, when converting (or warping) the first image of the first shape (e.g., rectangle) to an image of the second shape (e.g., circle), the electronic device may determine an image conversion method that allows the distortion (or change) of the object of the image to be reduced. In an embodiment, the electronic device may store various equations for transforming (or warping) an image. The electronic device may determine an equation, which is used to reduce the distortion of the object of the image when the first image is converted, from among various equations based on the linear information of the first image.

According to an embodiment, in operation 1540, the electronic device may convert the first image of the first shape (e.g., rectangle) into the second image of the second shape based on the determined conversion method.

According to an embodiment, in operation 1550, the electronic device may display the second image of the second shape on a display (e.g., the display module 160 of FIG. 1 or the display 210 of FIG. 2). According to an embodiment, the display area of a display may have a circular or edge-rounded shape. According to an embodiment, the electronic device may provide the second image of the second shape (e.g., circle) having reduced visual distortion to a user watching a display having a circular display area. The user of the electronic device may perceive an image with reduced distortion, and thus the electronic device may provide the user with an improved user experience.

Figure 16:
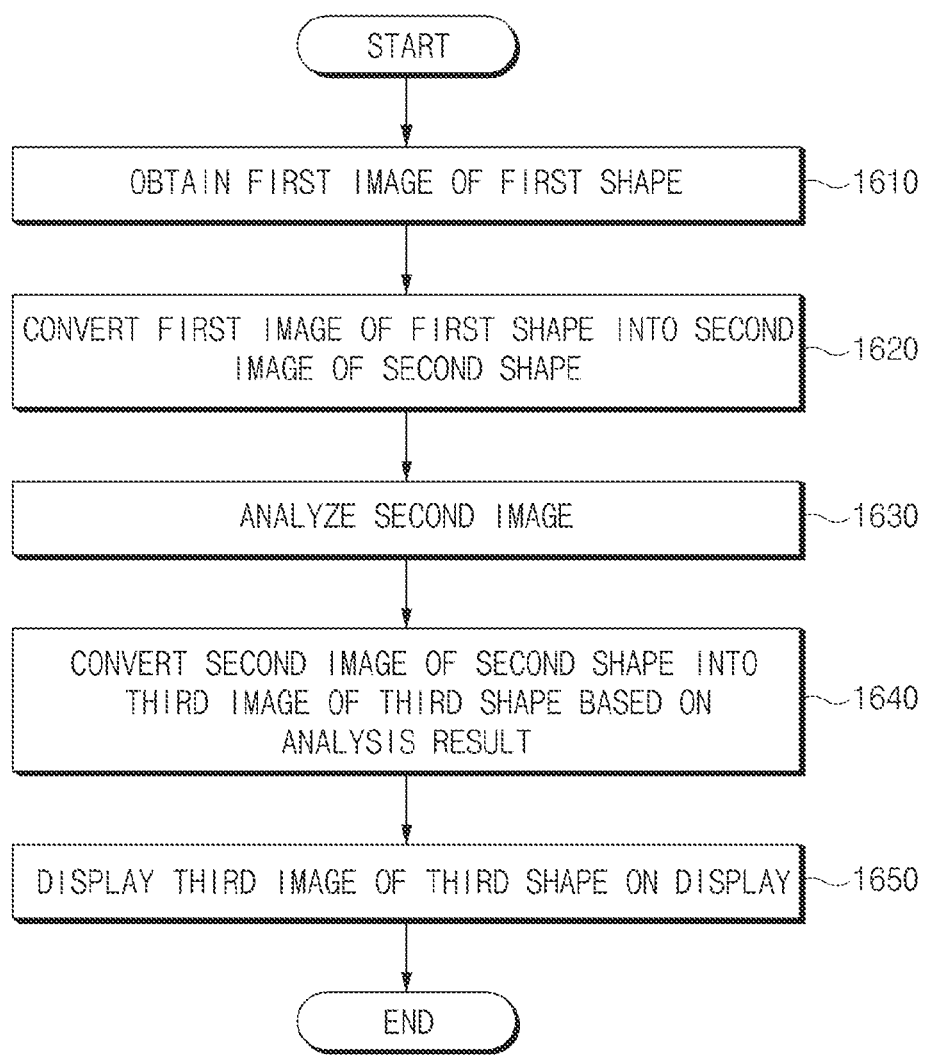
FIG. 16 is a flowchart illustrating an example operating method of an electronic device, according to various embodiments.

FIG. 16 is a flowchart illustrating an example operating method of an electronic device, according to various embodiments.

According to an embodiment, in operation 1610, an electronic device (e.g., the electronic device 101 of FIG. 1, the electronic device 201 of FIG. 2, the electronic device (1411, 1421, 1431, 1441) of FIG. 14, the first external electronic device (1412, 1422), or the second external electronic device (1433, 1443)) may obtain a first image of a first shape. For example, a first image of a first shape may correspond to a first rectangular image. Hereinafter, operations described as being performed by the electronic device may be understood as being performed by a processor (e.g., the processor 120 of FIG. 1, the processor 230 of FIG. 2, or the processor of FIG. 14).

According to an embodiment, in operation 1620, the electronic device may convert the first image of the first shape into a second image of a second shape. According to an embodiment, the electronic device may generate the second image of the second shape (e.g., a square shape)

through a resizing operation of reducing (or cropping) a length of a side (or edge) of the first image of the first shape (e.g., a rectangular shape). According to various embodiments, the electronic device may distinguish between a background and an object, which are included in the first image of the first shape (e.g., rectangle), may perform a resizing operation of reducing the length of a side (or edge) of an image including the background excluding the object, and may generate an image of a second shape (e.g., square). The electronic device may generate the second image of the second shape (e.g., square), which is arranged by moving a location of the object to face the center of the image of the second shape (e.g., square). According to various embodiments, the electronic device may distinguish the background and the object included in the first image (e.g., rectangular) of the first shape and then may perform a resizing operation of enlarging at least part of the background other than the object in an in-painting method. The electronic device may generate the second image of the second shape (e.g., square), in which the object is not enlarged and at least part of the background is enlarged, by performing the resizing operation. According to various embodiments, the electronic device may distinguish between a background and an object, which are included in the first image of the first shape (e.g., rectangle), may perform a resizing operation of reducing the length of a side (or edge) of an image including the background excluding the object, and may generate an image of a second shape (e.g., square). The electronic device may generate the second image of the second shape (e.g., square) by composing an object with an image of the second shape (e.g., square).

According to an embodiment, in operation 1630, the electronic device may analyze the second image. According to an embodiment, the electronic device may analyze objects or characteristics of the second image. In an embodiment, the electronic device may obtain linear information indicating the characteristic of the second image. In an embodiment, the electronic device may recognize an edge indicating a boundary of at least one object included in the second image and then may obtain linear information indicating the characteristics of the second image from the recognized edge. According to an embodiment, the linear information may include at least one line information or at least one straight line information, which is recognized from the second image or an edge obtained from the second image, through Hough transform. For example, the linear information may correspond to a Hough line generated through the Hough transform from the image.

According to an embodiment, in operation 1640, the electronic device may convert the second image of the second shape into a third image of a third shape based on the analysis result. According to an embodiment, when converting (or warping) the second image of the second shape (e.g., rectangle) into the third image of the third shape (e.g., circle), the electronic device may determine an image conversion method, which allows the distortion (or change) of the object of the second image to be reduced, based on the linear information (e.g., Hough line). In an embodiment, the electronic device may store various equations for transforming (or warping) an image. The electronic device may determine an equation, which is used to reduce the distortion of the object of the image when the second image is converted into an image of the third shape (e.g., circle), from among various equations based on the linear information of the second image of the second shape (e.g., rectangle). According to an embodiment, the electronic device may convert (or warp) the second image into the third image of the third shape (e.g., circle) using the determined image conversion method (or an equation for image conversion). In various embodiments, the electronic device may separate an object and a background from the second image of the second shape (e.g., square) and then may convert (or warp) an image of the second shape (e.g., square) including the background excluding the object into an image of the third shape (e.g., circle) using the determined image conversion method. In this case, the electronic device may compose the object with the converted image of the third shape (e.g., circle) and then may finally generate the third image of the third shape (e.g., circle). The electronic device may convert (or warp) an image of the second shape (e.g., square) including a background other than an object into an image of the third shape (e.g., circle), may compose the object and the background other than the object, and thus may generate the third image of the third shape. In this case, the distortion of the object may be reduced.

According to an embodiment, in operation 1650, the electronic device may display the third image of the third shape on a display (e.g., the display module 160 of FIG. 1 or the display 210 of FIG. 2). According to an embodiment, the display area of a display may have a circular or edge-rounded shape. According to an embodiment, the electronic device may provide a circular image having reduced visual distortion to a user watching a display having a circular display area. The user of the electronic device may perceive an image with reduced distortion, and thus the electronic device may provide the user with an improved user experience.

According to an embodiment of the disclosure, an operating method of an electronic device (e.g., the electronic device 101 of FIG. 1, the electronic device 201 of FIG. 2, the electronic device (1411, 1421, 1431, 1441) of FIG. 14, the first external electronic device (1412, 1422), or the second external electronic device (1433, 1443)) may include: obtaining a first image of a first shape, obtaining linear information indicating a morphological characteristic of an object in the first image of the first shape, determining a conversion method for converting the first image of the first shape into an image of a second shape based on the obtained linear information, converting the first image of the first shape into a second image of the second shape based on the determined conversion method, and displaying the converted second image of the second shape on a display.

According to an embodiment, the determining may include obtaining the linear information through Hough transform. The linear information may include information about a Hough line.

According to an embodiment, the obtaining of the linear information may include individually recognizing a background and an object, which are included in the first image of the first shape, separating the recognized object from the first image of the first shape, and obtaining the linear information indicating a morphological characteristic of the recognized background.

According to an embodiment, the converting may include determining the conversion method based on the linear information indicating the morphological characteristic of the recognized background and converting an image excluding the separated object, into an image of the second shape based on the determined conversion method.

According to an embodiment, the converting may include generating the second image of the second shape by composing the separated object with the converted image of the second shape.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   memory; and
   a processor operatively connected to the display and the memory,
   wherein the memory stores instructions that, when executed, cause the processor to:
   obtain a first image of a first shape;
   obtain linear information for first and second different directions indicating a morphological characteristic of an object in the first image of the first shape;
   determine a first number of straight lines in the first direction and a second number of straight lines in the second direction;
   determine a conversion method corresponding to a difference between the first number and the second number;
   convert the first image of the first shape into a second image of a second shape based on the determined conversion method; and display the converted second image of the second shape on the display.

2. The electronic device of claim 1, wherein the first shape corresponds to a rectangular shape, and
wherein the instructions, when executed, cause the processor to:
convert the first image corresponding to the rectangular shape into a third image corresponding to a third shape; and
obtain the linear information from the third image.

3. The electronic device of claim 2, wherein the instructions, when executed, cause the processor to:
individually recognize a background and an object, which are included in the first image corresponding to the rectangular shape;
convert the recognized background other than the recognized object into a background of the third shape by reducing or enlarging the recognized background other than the recognized object; and
generate the third image by composing the recognized object with the converted background of the third shape,
wherein the third shape corresponds to a square shape.

4. The electronic device of claim 3, wherein the instructions, when executed, cause the processor to:
obtain a feature of the first image corresponding to the first shape; and
individually recognize the background and the object based on the obtained feature.

5. The electronic device of claim 1, wherein the instructions, when executed, cause the processor to:
obtain the linear information through a Hough transform, and
wherein the linear information includes information about a Hough line.

6. The electronic device of claim 1, wherein the instructions, when executed, cause the processor to:
determine the conversion method, which reduces a change between the first image of the first shape and the second image of the second shape, based on the obtained linear information.

7. The electronic device of claim 1, wherein the instructions, when executed, cause the processor to:
individually recognize a background and an object, which are included in the first image of the first shape;
separate the recognized object from the first image of the first shape; and
obtain the linear information indicating a morphological characteristic of the recognized background.

8. The electronic device of claim 7, wherein the instructions, when executed, cause the processor to:
determine the conversion method based on the linear information indicating the morphological characteristic of the recognized background; and
convert an image, which excludes the separated object, into an image of the second shape based on the determined conversion method.

9. The electronic device of claim 8, wherein the instructions, when executed, cause the processor to:
generate the second image of the second shape by composing the separated object with the converted image of the second shape.

10. The electronic device of claim 1, wherein the instructions, when executed, cause the processor to:
individually recognize a background and an object, which are included in the first image of the first shape;
generate a third image obtained by separating the recognized object from the first image of the first shape;
convert the generated third image into a fourth image of the second shape by obtaining the linear information from the generated third image; and
display a fifth image of the second shape, which is obtained by composing the recognized object with the converted fourth image, on the display.

11. The electronic device of claim 1, wherein the memory stores a database including at least one equation for converting an image of the first shape into an image of the second shape.

12. The electronic device of claim 1, wherein the instructions, when executed, cause the processor to:
learn a morphological characteristic of an object in the first image using a machine learning model; and
determine the conversion method based on the learned result.

13. The electronic device of claim 1, wherein the instructions, when executed, cause the processor to:
obtain the linear information from at least one external electronic device.

14. The electronic device of claim 1, wherein the display includes a circular display area, and
wherein the instructions, when executed, cause the processor to:
display the second image of the second shape in the circular display area.

15. The electronic device of claim 1, wherein the instructions, when executed, cause the processor to:
convert the first image of the first shape into a grayscale image;
recognize an edge indicating a boundary of at least one object, which is included in the first image, from the grayscale image; and
obtain the linear information corresponding to at least one straight line based on the recognized edge.

16. An operating method of an electronic device, the method comprising:
obtaining a first image of a first shape;
obtaining linear information for first and second different directions indicating a morphological characteristic of an object in the first image of the first shape;
determining a first number of straight lines in the first direction and a second number of straight lines in the second direction;
determining a conversion method corresponding to a difference between the first number and the second number;
converting the first image of the first shape into a second image of a second shape based on the determined conversion method; and
displaying the converted second image of the second shape on a display.

17. The method of claim 16, wherein the determining includes:
obtaining the linear information through a Hough transform, and
wherein the linear information includes a Hough line by the Hough transform.

18. The method of claim 16, wherein the obtaining of the linear information includes:
individually recognizing a background and an object, which are included in the first image of the first shape;
separating the recognized object from the first image of the first shape; and obtaining the linear information indicating a morphological characteristic of the recognized background.

19. The method of claim 18, wherein the converting includes:
    determining the conversion method based on the linear information indicating the morphological characteristic of the recognized background; and
    converting an image, which excludes the separated object, into an image of the second shape based on the determined conversion method.

20. The method of claim 19, wherein the converting includes:
    generating the second image of the second shape by composing the separated object with the converted image of the second shape.

* * * * *